United States Patent
Nakano et al.

(10) Patent No.: US 10,444,764 B2
(45) Date of Patent: Oct. 15, 2019

(54) SELF-POSITION ESTIMATING APPARATUS AND SELF-POSITION ESTIMATING METHOD

(71) Applicant: MURATA MACHINERY, LTD., Kyoto-shi, Kyoto (JP)

(72) Inventors: Tsuyoshi Nakano, Kyoto (JP); Toshiki Harada, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 312 days.

(21) Appl. No.: 15/587,424

(22) Filed: May 5, 2017

(65) Prior Publication Data

US 2017/0344025 A1    Nov. 30, 2017

(30) Foreign Application Priority Data

May 25, 2016    (JP) .................. 2016-104415

(51) Int. Cl.
*G05D 1/02* (2006.01)
*G01C 21/20* (2006.01)
*G01C 21/00* (2006.01)

(52) U.S. Cl.
CPC ......... *G05D 1/0274* (2013.01); *G01C 21/005* (2013.01); *G01C 21/20* (2013.01); *G05D 1/024* (2013.01)

(58) Field of Classification Search
None
See application file for complete search history.

(56) References Cited

U.S. PATENT DOCUMENTS

| 6,567,744 B1* | 5/2003 | Katayama ............... G01C 21/36 701/410 |
| 9,632,504 B1* | 4/2017 | Watts .................... G05D 1/0231 |
| 2004/0215373 A1* | 10/2004 | Won ........................ G08G 1/161 701/1 |
| 2009/0226113 A1* | 9/2009 | Matsumoto ........ G06K 9/00691 382/284 |
| 2011/0098918 A1* | 4/2011 | Siliski .................. G01C 21/265 701/533 |

(Continued)

FOREIGN PATENT DOCUMENTS

| JP | 2004-005593 A | 1/2004 |
| JP | 2013-012128 A | 1/2013 |
| JP | 2015-141580 A | 8/2015 |

*Primary Examiner* — Rami Khatib
(74) *Attorney, Agent, or Firm* — Keating & Bennett, LLP

(57) ABSTRACT

A self-position estimating apparatus includes a storage, a local map generator, a self-position estimator, and an adjuster. The storage stores an environmental map representing a position of an obstacle present in a mobile environment. The local map generator generates a local map representing a relative position of an obstacle present around the mobile body, with respect to the mobile body. The self-position estimator estimates, among a plurality of disposing positions on a local map disposing region set in the environmental map, one of the disposing positions where most exact matching is obtained between the local map and the environmental map, as a first self-position. The self-position estimator estimates a rotation angle of the local map at the disposing position as a first posture. The adjuster adjusts a size of the local map disposing region according to a predetermined condition.

12 Claims, 16 Drawing Sheets

(56) References Cited

U.S. PATENT DOCUMENTS

| | | | |
|---|---|---|---|
| 2014/0156076 A1* | 6/2014 | Jeong | B25J 9/0003 |
| | | | 700/257 |
| 2016/0231744 A1* | 8/2016 | Kaname | G05D 1/0088 |
| 2016/0282873 A1* | 9/2016 | Masaki | G05D 1/024 |

* cited by examiner

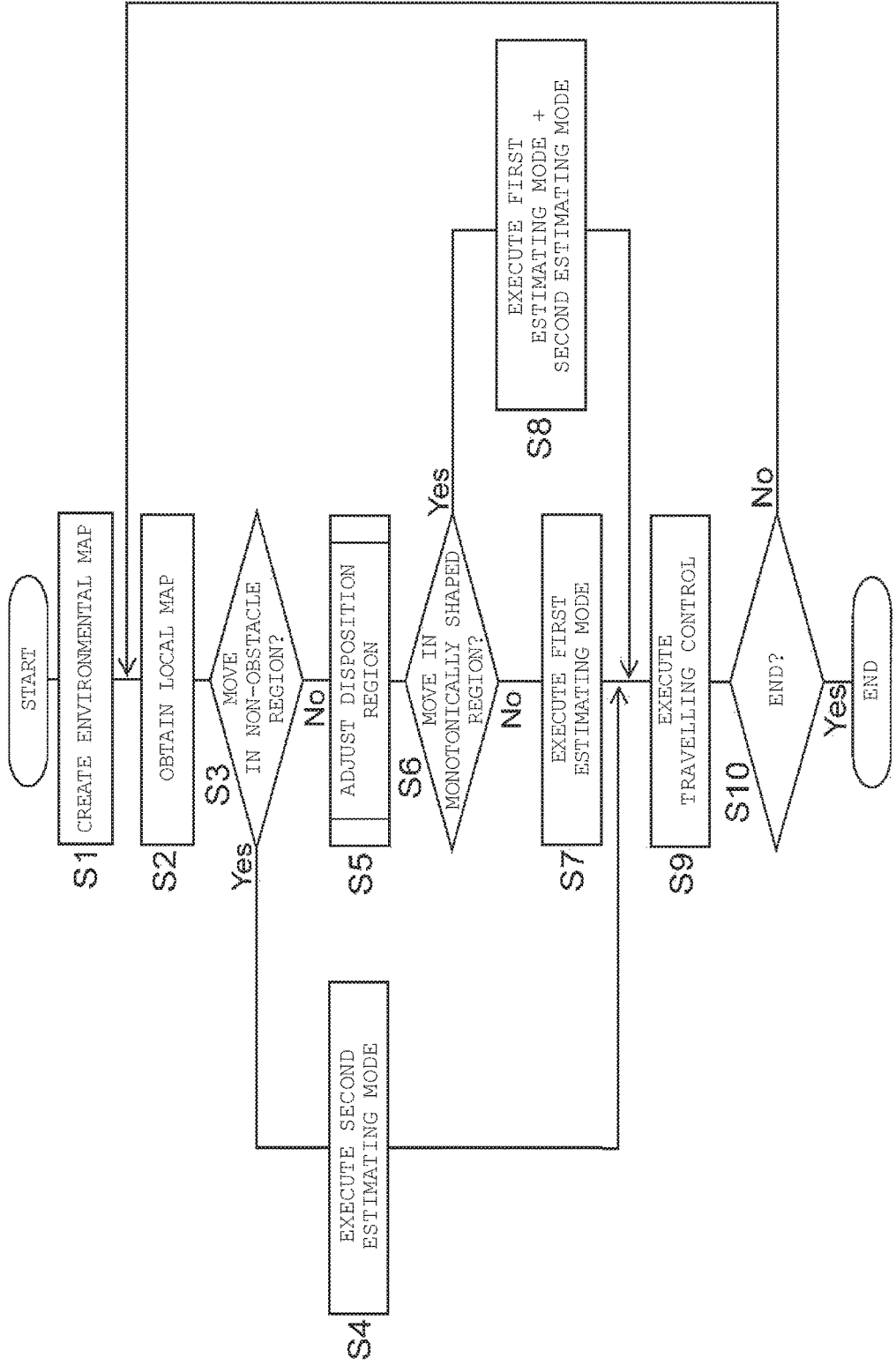

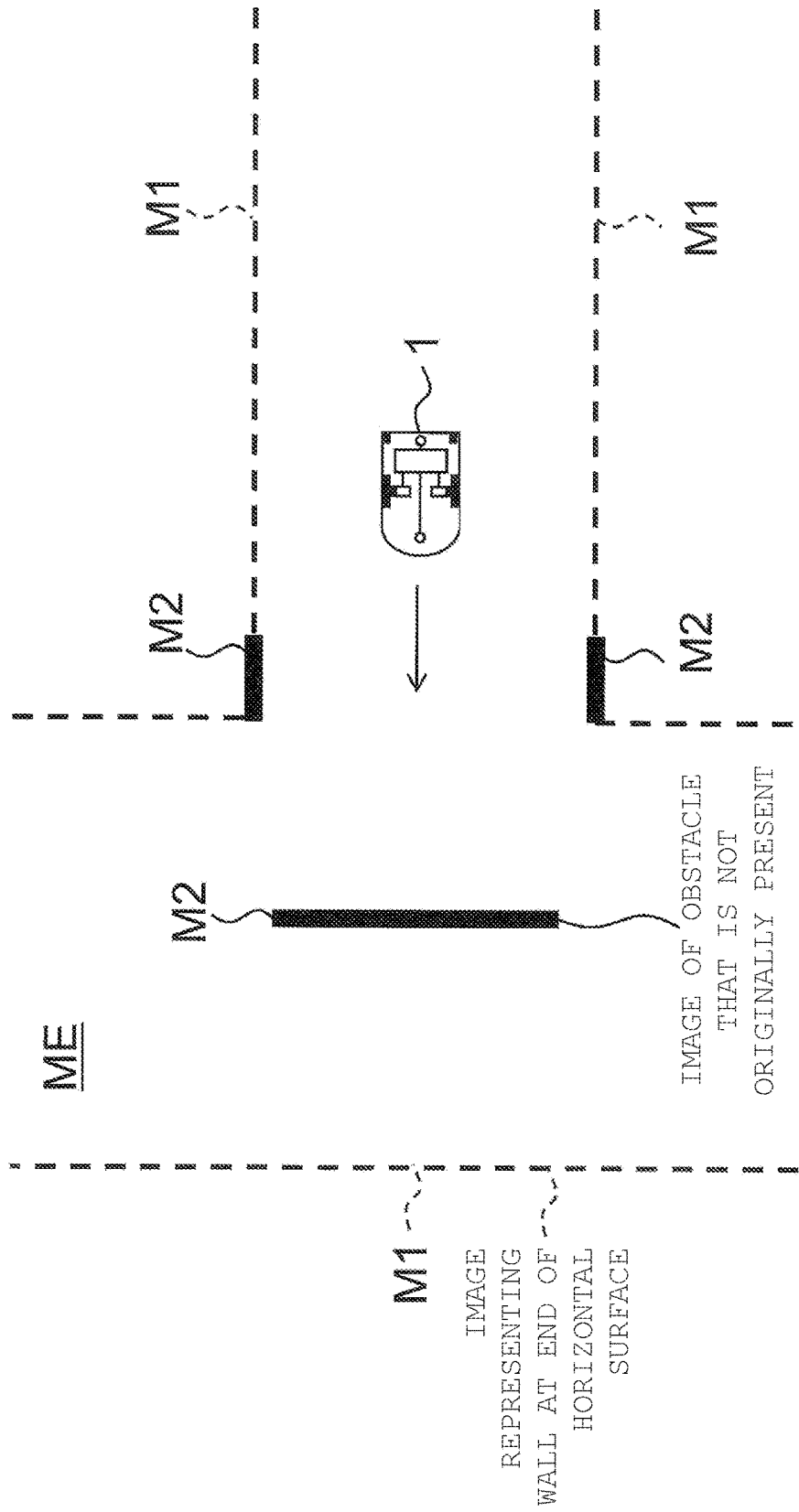

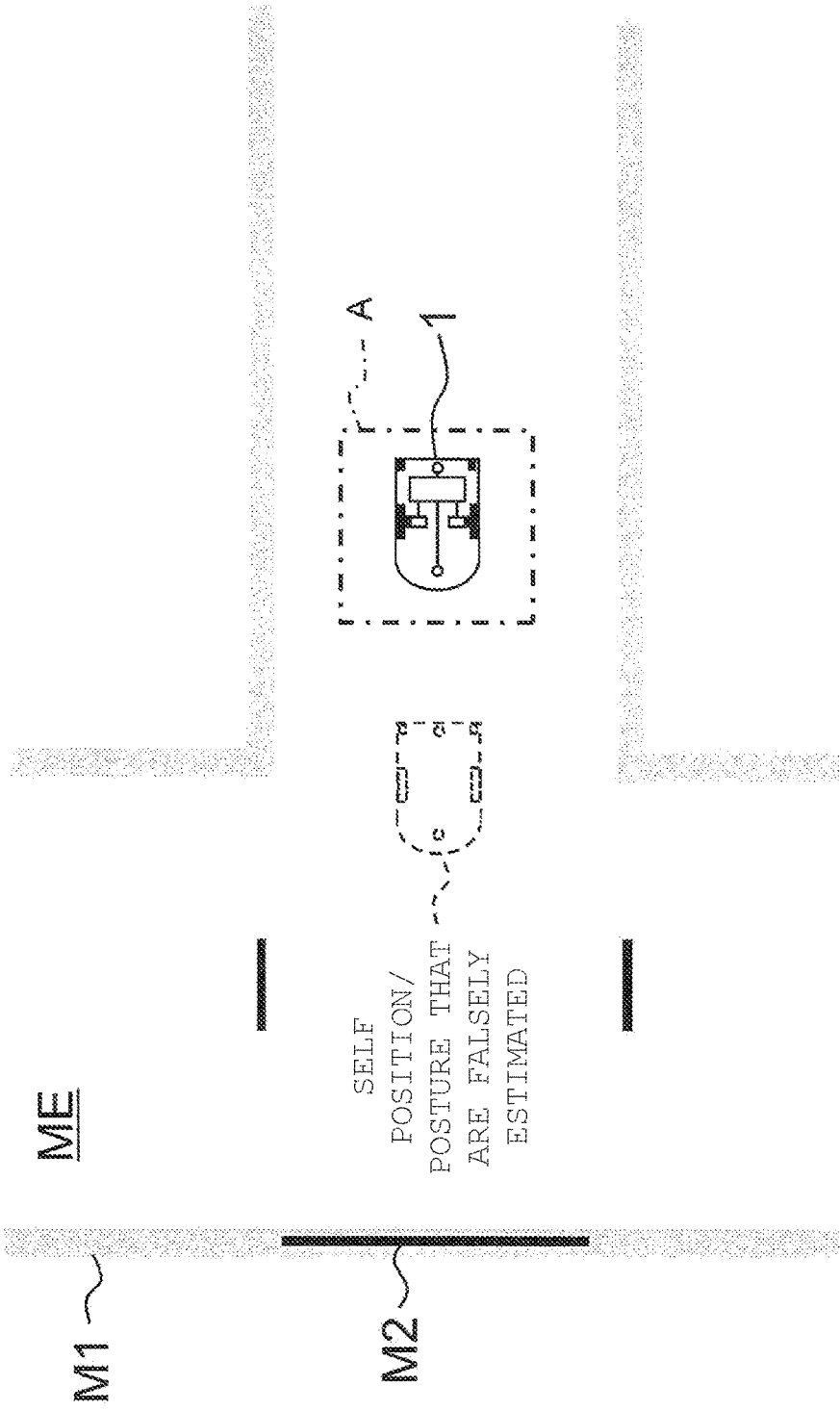

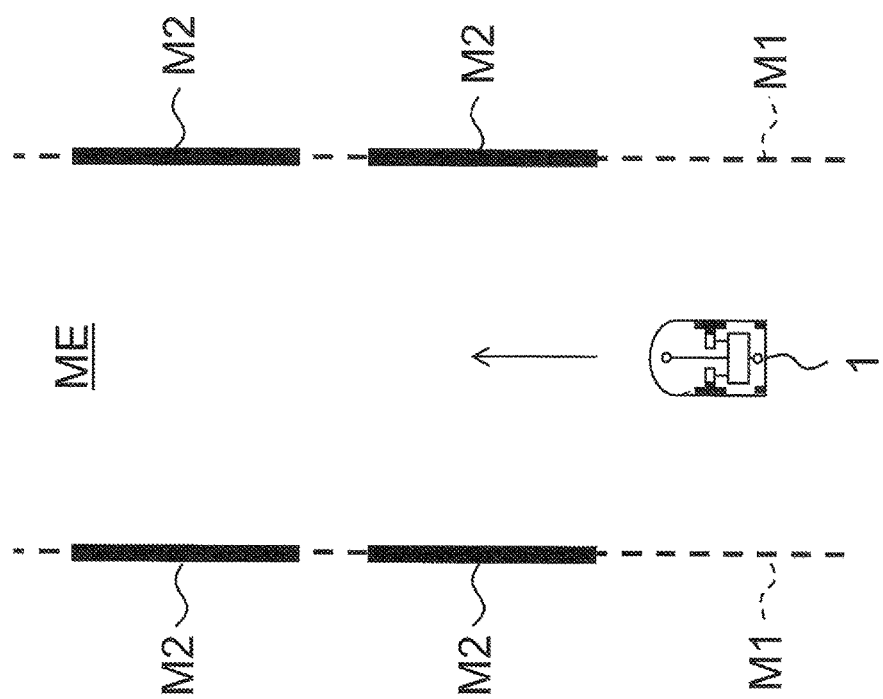

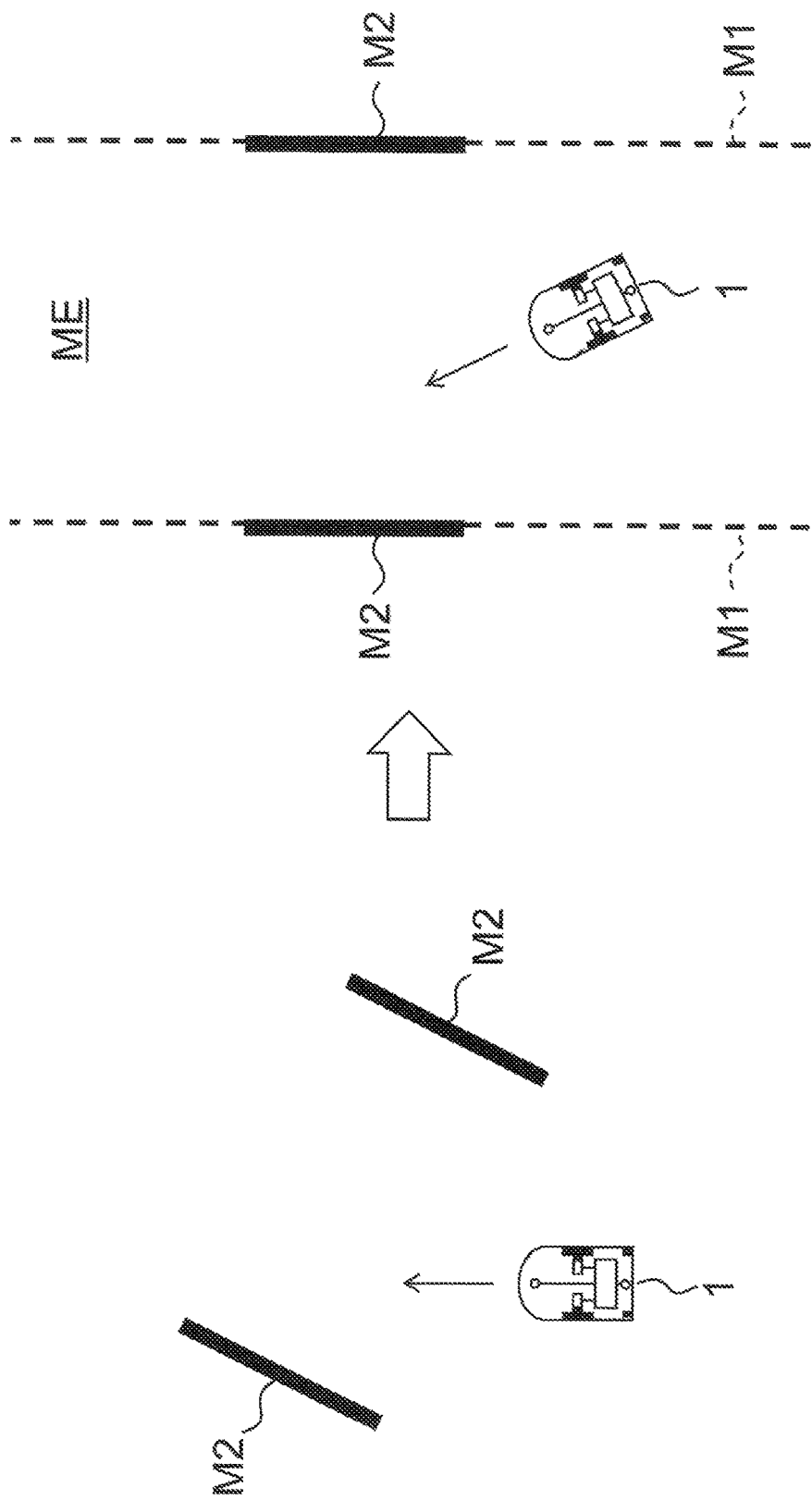

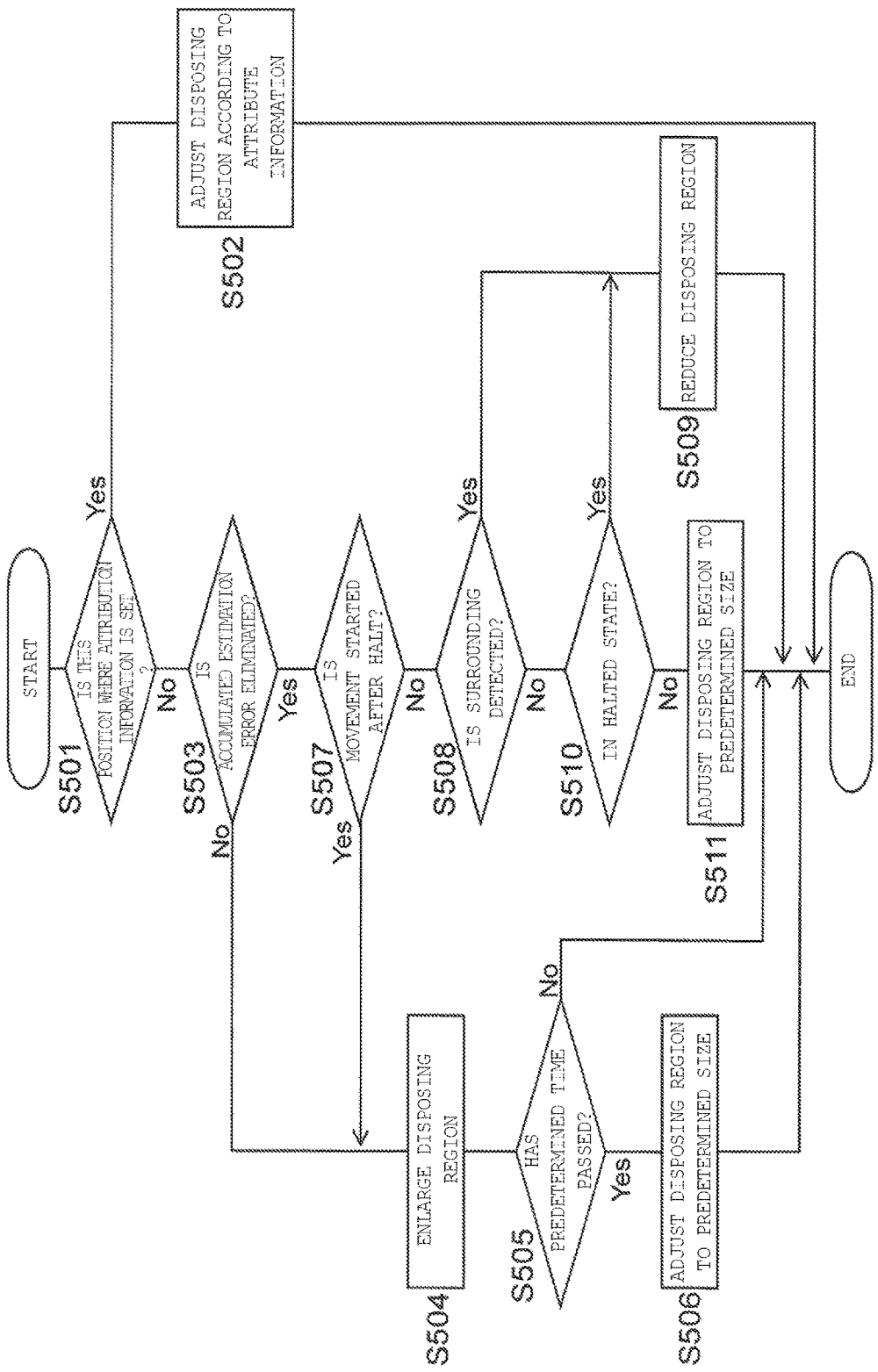

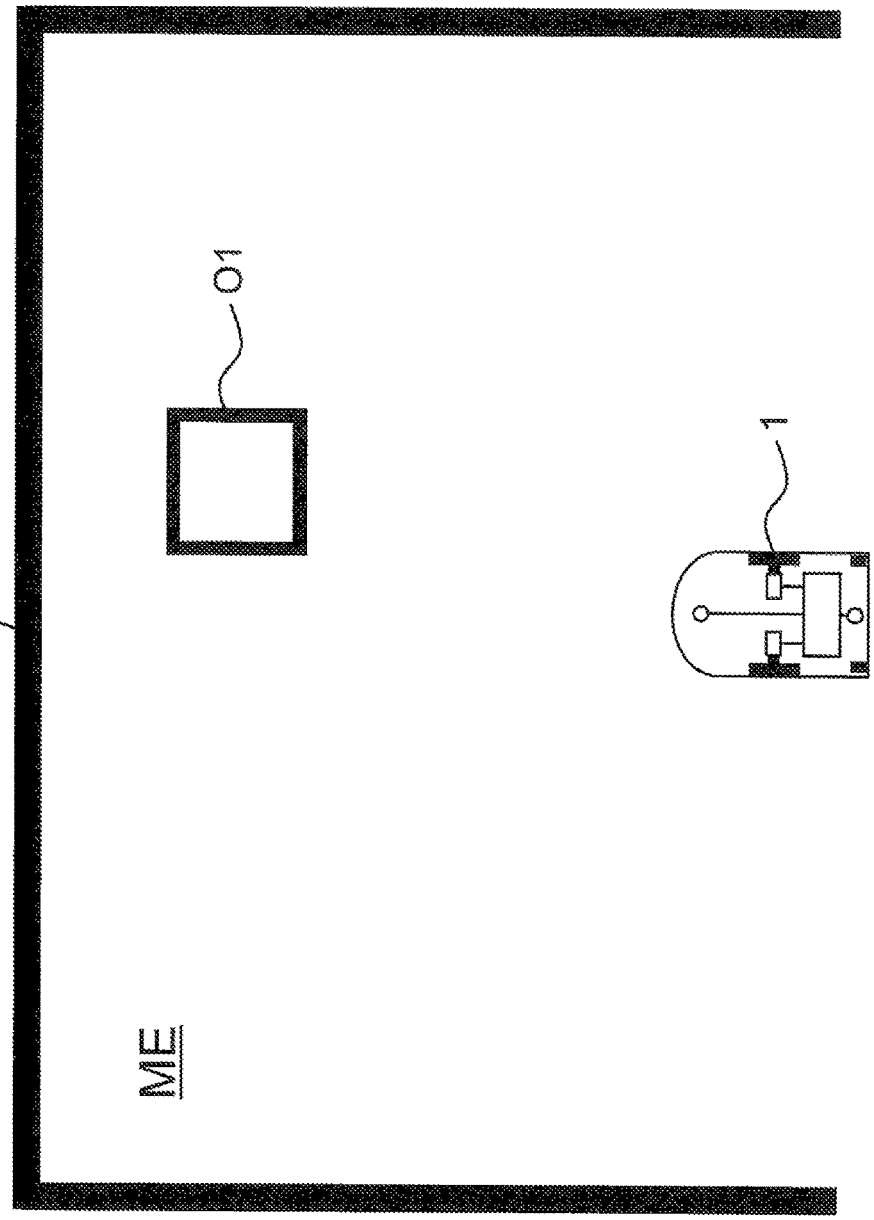

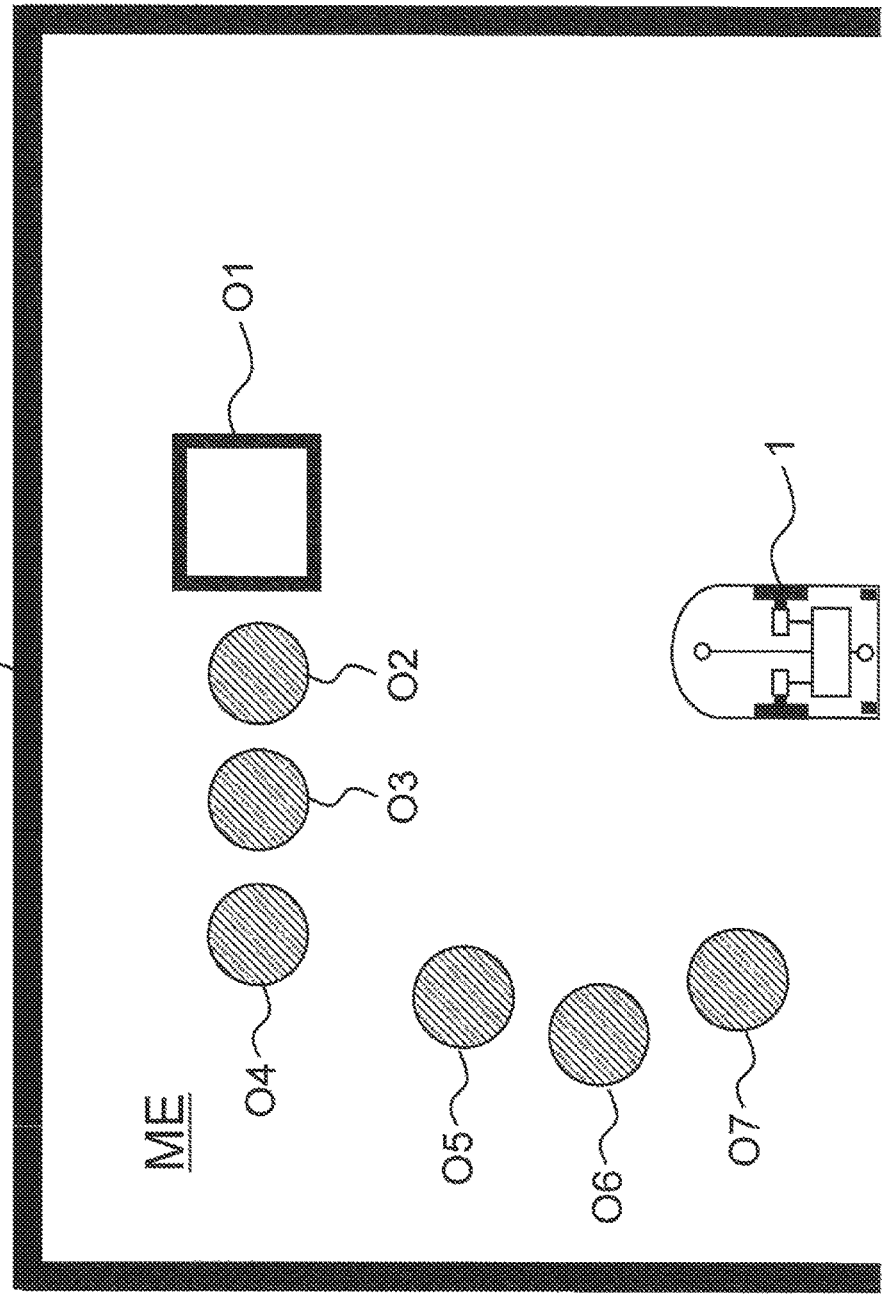

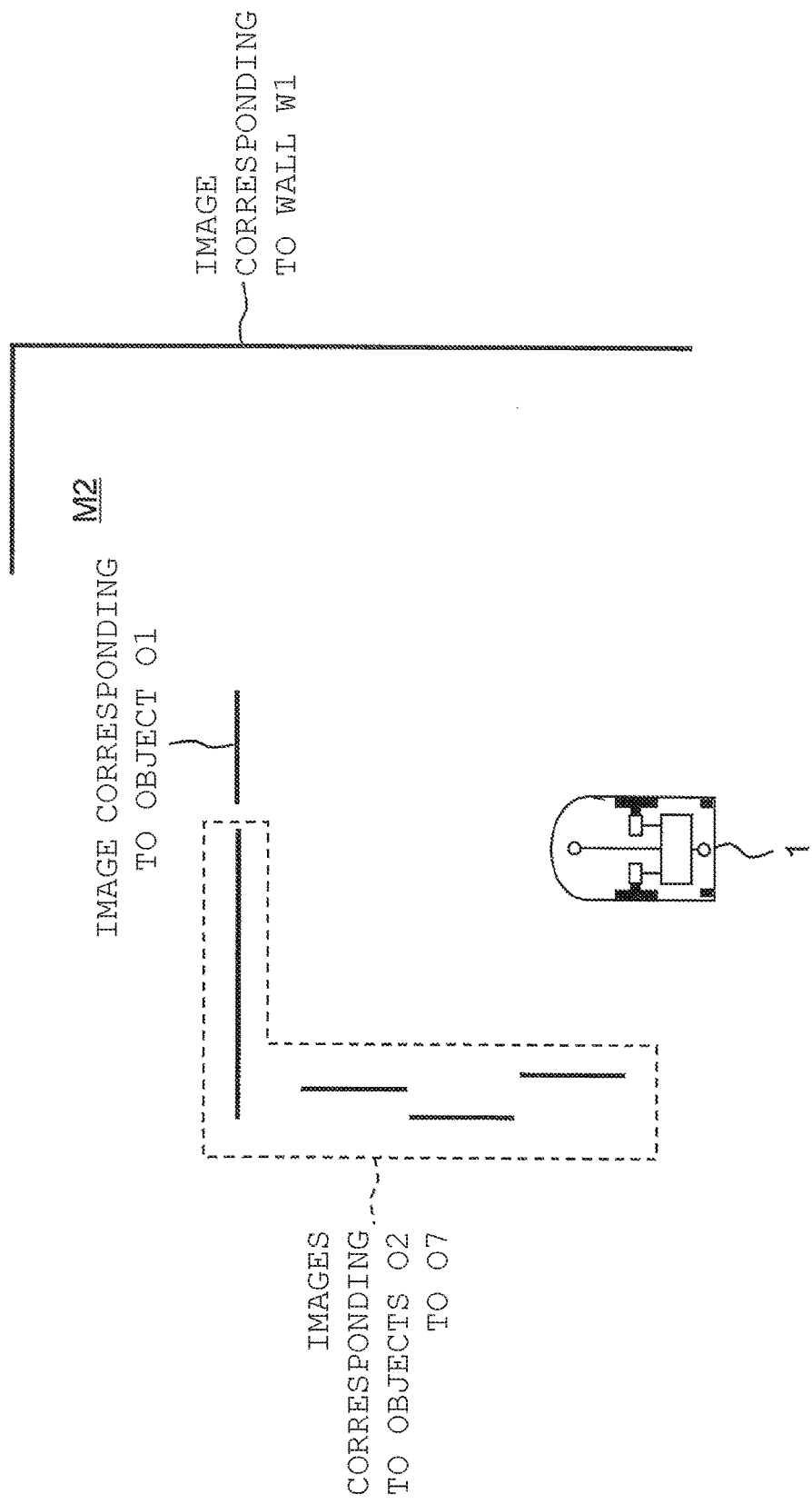

SELF-POSITION ESTIMATING APPARATUS AND SELF-POSITION ESTIMATING METHOD

This application claims the benefit of priority to Japanese Patent Application No. 2016-104415 filed on May 25, 2016. The entire contents of this application are hereby incorporated herein by reference.

BACKGROUND OF THE INVENTION

1. Field of the Invention

The present invention relates to an apparatus and a method that estimate a self-position and/or a posture of a mobile body moving in a mobile environment.

2. Description of the Related Art

Conventionally, there is known an apparatus that estimates a self-position that is a position of a mobile body, such as a vehicle or an autonomous traveling robot, and a posture at the self-position in an environment (mobile environment) where the mobile body moves. For example, Japanese Unexamined Patent Application Publication No. 2015-141580 discloses a mobile apparatus that estimates a self-position from data which is based on a distance between the mobile apparatus and an obstacle present in a working environment, and image (photograph) data of the working environment obtained by a camera.

In this apparatus, an image data detecting range is widened based on reliability of a self-position estimated by using data based on a distance, and when image data obtained by widening the detecting range includes a landmark, a self-position is estimated based on the image data.

To unconditionally widen the image data detecting range as in the above apparatus is sometimes inconvenient depending on the position of the mobile apparatus. For example, when image data obtained by widening a detecting range includes a plurality of landmarks having a similar shape, an inappropriate self-position may be calculated by using not the original landmark but other landmarks having a similar shape.

SUMMARY OF THE INVENTION

According to preferred embodiments of the present invention, in an apparatus that estimates a self-position of a mobile body based on map information representing a mobile environment and information obtained by a sensor, while accuracy of estimating a self-position and/or a posture of the mobile body is maintained, a computation amount and a time required for the estimation is reduced.

A plurality of aspects of various preferred embodiments of the present invention are described below. These aspects of various preferred embodiments can be arbitrarily combined as needed or desired.

A self-position estimating apparatus according to one aspect of a preferred embodiment of the present invention estimates a self-position and/or a posture of a mobile body in a mobile environment. The self-position estimating apparatus includes a storage, a local map generator, a self-position estimator, and an adjuster. The storage stores an environmental map representing a position of an obstacle present in a mobile environment. The local map generator generates a local map. A local map includes map information representing a relative position of the obstacle present around the mobile body, with respect to the mobile body.

The self-position estimator executes a first estimating mode. Specifically, when a local map is disposed and/or rotated at a plurality of disposing positions (candidates of self-positions) in a local map disposing region set on the environmental map, the self-position estimator estimates one of the disposing positions where most exact matching is obtained between the local map and the environmental map as a first self-position being the self-position of the mobile body in the mobile environment. Further, the self-position estimator estimates a rotation angle of the local map at the disposing position as a first posture of the mobile body at the first self-position. The adjuster adjusts a size of the local map disposing region according to a predetermined condition.

In the self-position estimating apparatus, the local map generator first generates a local map as map information to be matched with the environmental map. The adjuster then adjusts a size of a local map disposing region according to the predetermined condition.

Thereafter, the self-position estimator executes the first estimating mode. Specifically, the self-position estimator disposes the local map at a plurality of disposing positions (candidates of the self-positions) in the local map disposing region which has the size determined according to the predetermined condition and is set on the environmental map. Further, the self-position estimator rotates the local map at the disposing position. At this time, the self-position estimator estimates the disposing position where the local map most closely matches the environmental map out of the disposing positions in the local map disposing region, as the self-position (a first self-position) of the mobile body in the mobile environment. Further, if necessary, the self-position estimator estimates a rotation angle of the local map at the disposing position where the local map most closely matches the environmental map as the posture (the first posture) of the mobile body at the first self-position.

In the self-position estimating apparatus, during execution of the first estimating mode (estimation of a first self-position and/or a first posture of a mobile body 1 by map matching), a size of a local map disposing region defining a range of local map disposition is adjusted according to a predetermined condition. As a result, while accuracy of estimating the self-position and/or the posture of the mobile body is maintained, a computation amount required for the estimation by the map matching is decreased, and thus a time for the estimation is shortened.

After the mobile body moves from a non-obstacle region to an obstacle region, the adjuster may enlarge the size of the local map disposing region to be larger than a predetermined size for a predetermined time. The non-obstacle region is a region where only a small number of the obstacles are present or the obstacle is not present in a mobile environment. The obstacle region is a region where an obstacle is present in the mobile environment.

As a result, an estimation error accumulated during movement of a mobile body in the non-obstacle region is eliminated by map matching in which a local map disposing region is enlarged, so that accuracy of estimating a self-position and/or a posture of a mobile body is maintained.

While the mobile body is moving in the non-obstacle region, the self-position estimator does not have to execute the first estimating mode. As a result, in the map matching, when the estimation of the first self-position and/or the first posture is difficult, the self-position estimator does not execute the first estimating mode.

After the mobile body moves from a monotonically shaped region to a characteristically shaped region, the adjuster may enlarge the size of the local map disposing region to be larger than the predetermined size for a predetermined time. The monotonically shaped region is a region where an environmental map has a monotonous shape. The characteristically shaped region is a region where a characteristic shape is present on an environmental map.

As a result, an estimation error accumulated during movement of the mobile body on the monotonically shaped region is eliminated by map matching in which the local map disposing region is enlarged, so that accuracy of estimating the self-position and/or the posture of the mobile body is maintained.

While the mobile body is moving in the monotonically shaped region or after a predetermined time has passed, the adjuster may set the size of the local map disposing region to a predetermined size. As a result, while a computation amount required to estimate the first self-position and/or the first posture of the mobile body in the first estimating mode is decreased, a time for the estimation is shortened.

The mobile body may include one or more main wheels that move in the mobile environment. In this case, the self-position estimator is able to further execute a second estimating mode. The second estimating mode estimates, based on the rotation amounts of the main wheels, the self-position and/or the posture of the mobile body in the mobile environment as a second self-position and/or a second posture, respectively.

In this case, the adjuster enlarges the size of the local map disposing region to be larger than a size during normal execution of the first estimating mode for at least a predetermined time after a state of executing the second estimating mode is switched to a state of executing only the first estimating mode.

As a result, the estimation error(s) of the second self-position and/or the second posture estimated based on the rotation amounts of the main wheels are/is eliminated by execution of the first estimating mode in which the local map disposing region is enlarged, so that accuracy of estimating the self-position and/or the posture of the mobile body is maintained.

After the mobile body starts to move from a halted state, the adjuster may enlarge the size of the local map disposing region to be larger than a size during normal execution of the first estimating mode.

As a result, the estimation error(s) of the self-position and/or the posture occurred when the mobile body starts to move from the halted state are/is eliminated by execution of the first estimating mode in which the local map disposing region is enlarged, so that accuracy of estimating the self-position and/or the posture of the mobile body is maintained.

When the mobile body halts, the adjuster may reduce the size of the local map disposing region to be smaller than a size during the movement of the mobile body. As a result, when the mobile body is in the halted state and thus the self-position and/or the posture hardly change, the computation amount(s) necessary to estimate the first self-position and/or the first posture is decreased by using the small local map disposing region.

When the mobile body is surrounded by unknown obstacles that do not appear on the environmental map, the adjuster may reduce the size of the local map disposing region to be smaller than a size when the mobile body is not surrounded by the unknown obstacles. As a result, even when unknown obstacles are present, probability of appropriate map matching between the environmental map and the local map becomes high, so that the estimation of the first self-position and/or the first posture becomes accurate.

The storage may further store attribute information. The attribute information is information used to define the size of the local map disposing region at a predetermined position on an environmental map. In this case, the adjuster sets the size of the local map disposing region according to the attribute information.

As a result, the size of the local map disposing region is able to be adjusted according to conditions on positions in the environmental map (a mobile environment).

When a plurality of predetermined conditions, based on which the size of the local map disposing region is adjusted, simultaneously occurs, the adjuster may set the size of the local map disposing region according to a condition with a higher priority among the plurality of conditions. As a result, the size of the local map disposing region is able to be decided according to the condition with a higher priority.

A self-position estimating method according to another aspect of a preferred embodiment of the present invention is a method to estimate a self-position and/or a posture of a mobile body in a mobile environment. The self-position estimating method includes creating an environmental map representing a position of an obstacle present in a mobile environment, obtaining a local map representing a relative position of the obstacle present around the mobile body, with respect to the mobile body, and when the local map is disposed and/or rotated at a plurality of disposing positions in a local map disposing region being set on the environmental map and having a size adjusted according to a predetermined condition, estimating one of the disposing positions where most exact matching is obtained between the local map and the environmental map as the self-position of the mobile body in the mobile environment, and/or estimating a rotation angle of the local map at the disposing position as a posture of the mobile body on the self-position.

In the self-position estimating method, when the self-position and/or the posture of the mobile body are/is estimated by map matching, the size of the local map disposing region that defines a disposing range of the local map is adjusted according to the predetermined condition. As a result, while accuracy of estimating the self-position and/or the posture of the mobile body is maintained, a computation amount required for the estimation by the map matching is decreased, and thus a time for the estimation is shortened.

In the self-position estimating apparatus and the self-position estimating method of various preferred embodiments of the present invention, while the accuracy of estimating the self-position and/or the posture of the mobile body is maintained, the computation amount and the time required for the estimation is decreased.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a flowchart illustrating an operation of the mobile body.

FIG. 4B is a diagram illustrating one example where a local map including an image of an obstacle which is not present in a mobile environment is obtained by infrared light reflected by a horizontal surface.

FIG. 4C is a diagram illustrating one example where when the local map includes an image of the horizontal surface which is not originally present in the mobile environment, false estimation of a self-position and/or a posture of the mobile body occurs.

FIG. 5A is a diagram illustrating one example where the self-position cannot be estimated by map matching.

FIG. 5B is a diagram illustrating one example where the posture is able to be estimated by map matching.

FIG. 6 is a flow chart illustrating a method for adjusting a local map disposing region.

FIG. 7A is a diagram illustrating one example where a surrounding determination is made (part 1).

FIG. 7B is a diagram illustrating one example where a surrounding determination is made (part 2).

FIG. 8B is a diagram illustrating one example of a local map which is obtained when unknown obstacles are present.

DETAILED DESCRIPTION OF THE PREFERRED EMBODIMENTS

First Preferred Embodiment

A mobile body 1 using a self-position estimating apparatus 100 according to a preferred embodiment of the present invention will be described below. The mobile body 1 according to the present preferred embodiment is a mobile body which is capable of autonomously traveling while reproducing a route instructed by a user, for example.

Figure 1:
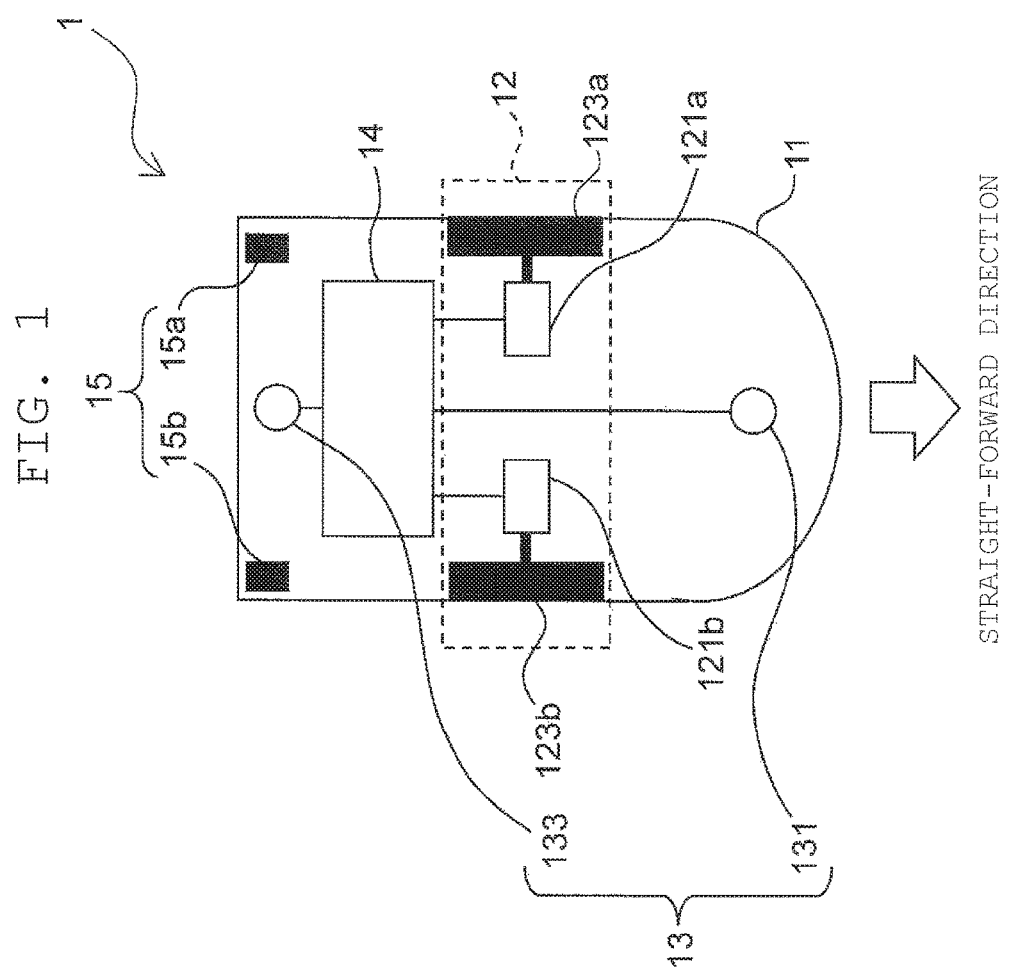
FIG. 1 is a diagram illustrating a configuration of a mobile body according to a preferred embodiment of the present invention.

A configuration of the mobile body 1 will be described first with reference to FIG. 1. FIG. 1 is a diagram illustrating a configuration of the mobile body according to a preferred embodiment of the present invention.

The mobile body 1 includes a main body 11. The main body 11 is, for example, a housing constituting the main body of the mobile body 1. In the present preferred embodiment, a "self-position" described later is defined as a position (coordinates) of a center of the main body 11 on an environmental map M1 representing a mobile environment ME. Further, the term "self" refers to the main body 11 of the mobile body 1.

The mobile body 1 includes a mobile unit 12. The mobile unit 12 is, for example, a differential two-wheel traveling unit that moves the main body 11.

Specifically, the mobile unit 12 includes a pair of motors 121a and 121b. The pair of motors 121a and 121b include an electric motor, such as a servo motor or a brushless motor that is disposed on a bottom of the main body 11. The pair of motors 121a and 121b is electrically connected to a controller 14, and rotates output rotary shafts of the motors 121a and 121b independently at any rotation number and with any torque, based on a command from the controller 14.

The mobile unit 12 includes a pair of main wheels 123a and 123b. The pair of main wheels 123a and 123b partially makes contact with a floor surface (a moving surface) of the mobile environment ME respectively, and is connected to the output rotary shafts of the pair of motors 121a and 121b, respectively. As a result, the main wheels 123a and 123b are independently rotated by the motors 121a and 121b, respectively, to move the main body 11.

Since the main wheels 123a and 123b are able to be independently rotated as described above, the posture of the main body 11 is able to be changed by making the rotation numbers of the main wheels 123a and 123b different. On the other hand, when the rotation numbers of the pair of main wheels 123a and 123b are the same, the main body 11 is able to be made to travel straight.

Figure 2:
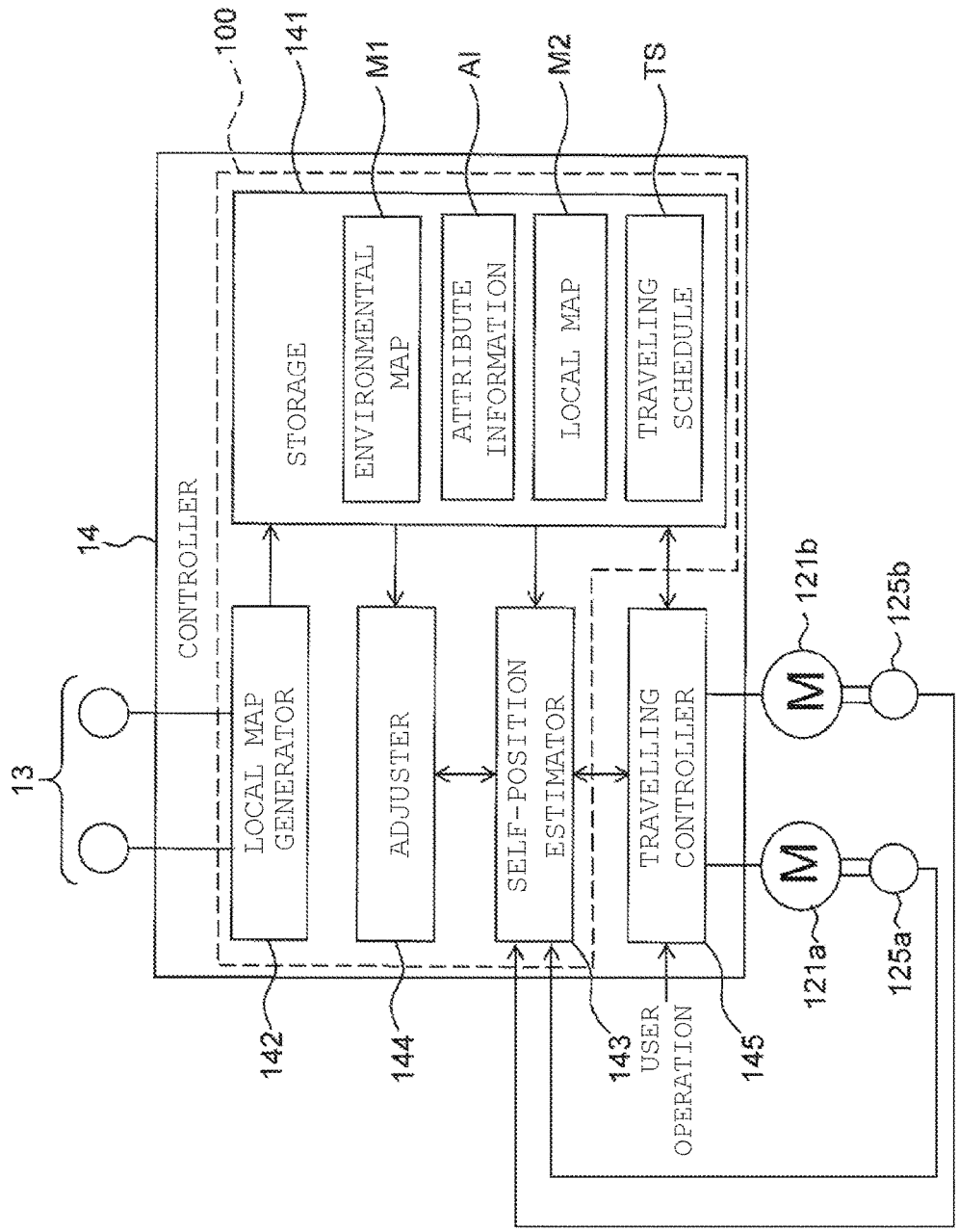
FIG. 2 is a diagram illustrating a configuration of a controller.

The output rotary shafts of the motors 121a and 121b are respectively provided with encoders 125a and 125b (FIG. 2). The encoders 125a and 125b are incremental encoders that output pulse signals based on rotation amounts of the output rotary shafts of the motors 121a and 121b. As a result, a self-position estimator 143 (described later) is able to estimate a position and/or a posture of the mobile body 1 (the main body 11) in the mobile environment ME, based on the rotation amounts of the motors 121a and 121b, namely, the rotation amounts of the main wheels 123a and 123b.

The mobile body 1 includes a laser range sensor 13. The laser range sensor 13 is a laser range finder (LRF) that radially emits a laser beam which is pulse-oscillated by, for example, a laser oscillator to an obstacle that is a structure in the mobile environment ME (for example, a pillar, a shelf, or a wall disposed in the mobile environment ME), and receives reflected light reflected by the obstacle through a laser receiver so as to obtain information relating to the obstacle.

The laser range sensor 13 includes a first laser range sensor 131 disposed on a forward portion of the main body 11, and a second laser range sensor 133 disposed on a backward portion of the main body 11.

The first laser range sensor 131 radially generates a laser beam horizontally in front of the main body 11 to obtain information about an obstacle within an about 20-meter radius, for example, of the first laser range sensor 131 in front of the main body 11.

The second laser range sensor 133 radially generates a laser beam horizontally at a rear of the main body 11 to obtain information about an obstacle within an about 5-meter radius, for example, of the second laser range sensor 133 at the rear of the main body 11.

A detectable range of the laser range sensor is not limited to the above values, and may be appropriately changed according to applications of the mobile body 1.

The mobile body 1 includes a controller 14. The controller 14 preferably is a microcomputer system that includes a CPU (a Central Processing Unit), a hard disc device, a ROM (a Read Only Memory), a RAM (a Random Access Memory), a storage device such as a storage medium reading device, and an interface that converts signals. The controller 14 controls respective sections of the mobile body 1. A configuration of controller 14 will be described in detail later.

The mobile body 1 may further include an auxiliary wheel section 15. The auxiliary wheel section 15 includes two auxiliary wheels 15a and 15b. The two auxiliary wheels 15a and 15b are mounted so as to be rotatable independently. The provision of the auxiliary wheel section 15 enables the mobile body 1 to move stably and smoothly.

A configuration of the controller 14 will be described with reference to FIG. 2. FIG. 2 is a diagram illustrating the configuration of the controller.

Some or all of the functions of the sections of the controller 14 described below may be achieved as programs executable by the microcomputer system. Further, the programs may be stored in the storage device of the microcomputer system. Alternatively, some or all of the functions may be achieved by custom ICs.

The controller 14 is configured and/or programmed to include a storage 141. The storage 141 is a part of a storage region of the storage device in a computer system constituting the controller 14. The storage 141 stores various types of information to be used to control the mobile body 1.

Specifically, the storage 141 stores an environmental map M1. The environmental map M1 includes, for example, map information representing a position of an obstacle which is present in the mobile environment ME. Specifically, the environmental map M1 includes an aggregate of coordinate value data indicating a position of an obstacle on a coordinate plane representing the mobile environment ME.

The environmental map M1, which is represented as coordinate value data indicating a position of an obstacle on the coordinate plane representing the mobile environment ME, enables, by map matching between the environmental map M1 and a local map M2 (described later), estimation of a position and/or a posture of the mobile body 1 (main body 11) in the mobile environment ME as a coordinate value on the coordinate plane representing the mobile environment ME and/or a rotation angle at which the local map M2 rotates from a reference coordinate axis.

The storage 141 stores attribute information AI. The attribute information AI is information including operations to be performed by the mobile body 1 at a predetermined position in the mobile environment ME. In the present preferred embodiment, the attribute information AI defines a size of a local map disposing region A at the predetermined position on the environmental map M1. As a result, when the mobile body 1 reaches the predetermined position on the environmental map M1, an adjuster 144, which the controller 14 is configured and/or programmed to include, adjusts the size of the local map disposing region A according to the attribute information AI.

The attribute information AI may define not only the size of the local map disposing region A at the predetermined position on the environmental map M1 but also a shape of the local map disposing region A at the predetermined position. For example, when the local map disposing region A has a quadrate shape, a length of one side of the quadrate and an identifier indicating that the local map disposing region A has the quadrate shape may be associated with the attribute information AI so as to be stored.

Alternatively, the local map disposing region A having any shape may be defined by storing a formula (an inequality) for a region to be defined on coordinates of a moving plane, in the attribute information AI.

Alternatively, the attribute information AI may include a speed and a posture of the mobile body 1 at a predetermined position in the mobile environment ME (the environmental map M1). For example, an operation such as halt at a position near a lift may be stored in the attribute information AI. Further, an operation based on an application of the mobile body 1 (for example, display of a specific advertisement at a predetermined position in the mobile environment ME) may be stored in the attribute information AI.

The controller 14 is configured and/or programmed to include a local map generator 142. The local map generator 142 generates a local map M2, based on a signal obtained from the laser range sensor 13. Specifically, the local map generator 142 calculates a distance between the laser range sensor 13 and an obstacle based on a time difference between timing at which the laser range sensor 13 emits a laser beam and timing at which the laser range sensor 13 (the laser receiver) receives reflected light. Further, for example, the local map generator 142 may calculate a direction in which an obstacle is present as viewed from the main body 11 based on an angle of a light receiving surface of the laser receiver when the light receiving surface receives the reflected light.

Thereafter, the local map generator 142 converts a relative distance of the obstacle viewed from the main body 11 calculated based on the above time difference, and the angle of the light receiving surface when receiving the reflected light, into coordinate values on the coordinate plane representing the mobile environment ME respectively. As a result, the local map generator 142 generates a local map representing a relative position of an obstacle around the mobile body 1 (the main body 11) with respect to the mobile body 1.

For example, when a distance between the mobile body 1 and the obstacle is calculated as R and, and when the angle of the light receiving surface of the laser range sensor 13 is α (the angle is positive in counterclockwise rotation) with respect to a straight-forward direction of the mobile body 1 (FIG. 1), the local map generator 142 may calculate the relative position of the obstacle with respect to the mobile body 1 as $(R^*\cos\alpha, R^*\sin\alpha)$ in a coordinate system where a center of the mobile body 1 is an original point.

The controller 14 is configured and/or programmed to include a self-position estimator 143. While the mobile body 1 is moving in the mobile environment ME, the self-position estimator 143 estimates a position of the mobile body 1 in the mobile environment ME (called a self-position) and/or an angle of the mobile body 1 with respect to a predetermined axis (for example, an X axis) (called a posture). In the present preferred embodiment, the self-position estimator 143 may execute a first estimating mode and a second estimating mode as modes to estimate the self-position and/or the posture.

In the first estimating mode, the self-position and/or the posture of the mobile body 1 are/is estimated by map matching between the local map obtained by the local map generator 142 and the environmental map M1 stored in the storage 141. The self-position and the posture estimated in the first estimating mode are called a first self-position and a first posture respectively.

During execution of the first estimating mode, the self-position estimator 143 first disposes the local map M2 at a position on the environmental map M1 calculated based on the rotation amounts of the main wheels 123*a* and 123*b*. The self-position estimator 143 then rotates, at the position, the local map M2 by the posture (the angle) calculated based on the rotation amounts of the main wheels 123*a* and 123*b*, to perform map matching between the environmental map M1 and the local map M2.

In the present preferred embodiment, in consideration of the estimation error(s) of the position and/or the posture estimated based on the rotation amounts of the main wheels 123*a* and 123*b*, the self-position estimator 143 provides ranges to the disposing position and the rotation angle on the local map M2. A range of a disposing position and an alteration width of a rotation angle on a local map M2 used to perform the map matching is called a "local map disposing region A".

When performing map matching between the environmental map M1 and the local map M2 to estimate a first self-position and/or a first posture (when the first estimating mode is executed), the self-position estimator 143 provides ranges to the disposing position and the rotation angle on the local map M2. As a result, the self-position estimator 143 cancels the estimation error(s) of the self-position and/or the posture based on the rotation amounts of the main wheels 123a and 123b, and the estimation error(s) of the self-position and/or the posture in the map matching (mainly, caused by error(s) included in the local map M2 and/or the environmental map M1 obtained by the laser range sensor 13), so as to accurately estimate the first self-position and/or the first posture.

In the second estimating mode, the self-position and/or the posture of the mobile body 1 on the environmental map M1 are/is estimated based on the rotation amounts of the motors 121a and 121b (the main wheels 123a and 123b) obtained from the encoders 125a and 125b. The self-position and the posture estimated in the second estimating mode are called a second self-position and a second posture, respectively.

The self-position and/or the posture are/is estimated based on the rotation amounts of the main wheels 123a and 123b by adding a moving distance and/or a posture change calculated based on the rotation amounts of the main wheels 123a and 123b to the self-position and/or the posture estimated at a previous time.

For example, in the map matching, the second estimating mode is executed when accurate estimation of a self-position and a posture is difficult. For example, while the mobile body 1 is moving in a region where obstacles detectable by the laser range sensor 13 are not present or a region where obstacles are present but the number of obstacles is too small and thus exact map matching cannot be performed (called a non-obstacle region), the second estimating mode is executed.

Alternatively, for example, also while the mobile body is moving in a region of the mobile environment ME having a monotonous shape, such as a linear passage defined by two linear walls, namely, a region where only monotonous-shaped local map or environmental map M1 is generated (called a monotonically shaped region), the second estimating mode is executed.

The controller 14 is configured and/or programmed to include the adjuster 144. The adjuster 144 adjusts a size of a range of a disposing position on the environmental map M1 where a local map is disposed (the local map disposing region A), according to a predetermined condition. For example, when the local map disposing region A is defined as a quadrate in which a length of one side is L, the adjuster 144 adjusts the value L according to a predetermined condition.

Alternatively, when the local map disposing region A is defined as, for example, a circle with a radius R, the size of the local map disposing region A is able to be adjusted by adjusting the value R according to a predetermined condition.

When an alteration width of the rotation angle (the posture) at each disposing position on the local map M2 is defined as Δθ on the local map disposing region A, the adjuster 144 adjusts Δθ indicating the alteration range of the rotation angle (the posture) according to a predetermined condition, so that the size of the local map disposing region A is able to be adjusted.

The storage 141, the local map generator 142, the self-position estimator 143, and the adjuster 144 define the self-position estimating apparatus 100 according to the present preferred embodiment.

The controller 14 is configured and/or programmed to include a traveling controller 145. The traveling controller 145 controls the motors 121a and 121b. The traveling controller 145 is, for example, a motor driver that calculates control amounts of the motors 121a and 121b, and outputs driving power based on the control amounts to the motors 121a and 121b respectively. The traveling controller 145 calculates the control amounts of the motors 121a and 121b so that rotation amounts (rotation speeds) of the motors 121a and 121b per unit time input from the encoders 125a and 125b become desired rotation speeds (feedback control).

The traveling controller 145 may execute any one of an autonomous mode and a manual mode according to switching made by a user. During execution of the autonomous mode, the traveling controller 145 calculates the control amounts of the motors 121a and 121b, for example, based on a difference between passing positions indicated by a traveling schedule TS stored in the storage 141 (for example, coordinate values on the environmental map M1) and a self-position and/or a posture estimated by the self-position estimator 143, so as to output driving power based on the calculated control amounts to the motors.

As a result, during execution of the autonomous mode, the traveling controller 145 causes the main body 11 to autonomously move according to the traveling schedule TS.

On the other hand, during execution of the manual mode, the traveling controller 145 accepts a user's operation through, for example, a controller or a computer system communicable with the mobile body 1 through wired or wireless connection, or an operation handle (not shown) mounted to the mobile body 1, to control the motors 121a and 121b based on an operation amount of the user's operation. As a result, the mobile body 1 is movable by the user's operation.

Since the controller 14 has the above configuration, during execution of the first estimating mode (estimation of the self-position and/or the posture by map matching), the self-position estimating apparatus 100 is able to adjust the size of the local map disposing region A according to a predetermined condition.

As a result, while accuracy of estimating the self-position and/or the posture of the mobile body 1 is maintained, a computation amount required to estimate the self-position and/or the posture by the map matching is prevented from excessively increasing. Further, a time for the estimation is shortened.

An operation of the mobile body 1 during movement in the mobile environment ME will be described with reference to FIG. 3. FIG. 3 is a flowchart illustrating the operation of the mobile body.

In the following, there will be described an operation to instruct the operation of the mobile body 1 to be performed by a user to the mobile body 1 and to create an environmental map M1, to cause the mobile body 1 to autonomously move according to the instructed operation.

First, the traveling mode is set to the manual mode, and the operation of the mobile body 1 to be performed by a user and the environmental map M1 representing the mobile environment ME where the mobile body 1 moves are instructed to the mobile body 1 (step S1).

Specifically, while the mobile body 1 is moving in the mobile environment ME according to a user's operation, the local map generator 142 first generates a local map M2 at every predetermined time interval. The self-position estimator 143 then performs map matching between the environmental map M1 and the local map M2 created until this stage to estimate the self-position and/or the posture of the mobile body 1 (the main body 11).

After estimating the self-position and/or the posture, the self-position estimator 143 combines the local map M2 that is currently obtained and is converted into coordinates at the estimated self-position with the environmental map M1 created until this stage, to create a new environmental map M1. Further, the self-position estimator 143 associates the estimated self-position and/or the estimated posture with the time(s) at which the self-position and/or the posture are/is estimated, and creates a traveling schedule TS to store the traveling schedule TS in the storage 141.

Further, while the environmental map M1 and the traveling schedule TS are being instructed to the mobile body 1, the user, if necessary, sets a size of a local map disposing region A by using an input device to operate the mobile body 1. When the user sets the size of the local map disposing region A, the self-position estimator 143 associates the size of the local map disposing region A input from the input device with the self-position and/or the posture of the mobile body 1 when the local map disposing region A is set, to store the size and the self-position and/or the posture as attribute information AI in the storage 141.

Figure 4A:
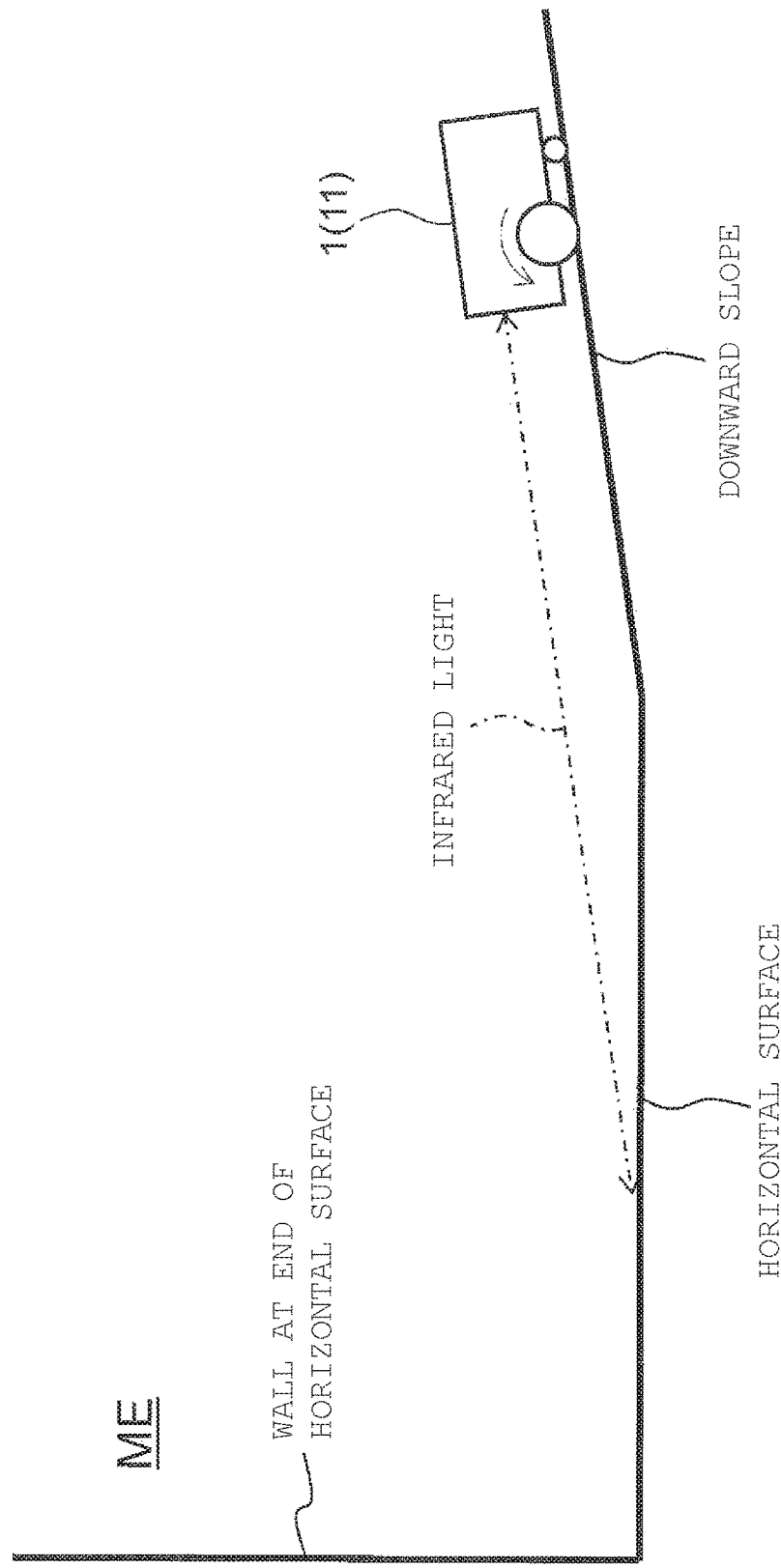
FIG. 4A is a diagram illustrating one example of a passage whose attribute information is set.

For example, the user sets the attribute information AI while the mobile body 1 is moving on a passage in which, as illustrated in FIG. 4A, a downward slope is present, a horizontal surface is present after the mobile body 1 passes the downward slope, and a wall (vertical surface) is present at the end of the horizontal surface. FIG. 4A is a diagram illustrating one example of a passage whose attribute information is set.

When the passage on which the mobile body 1 is moving has a downward slope and the horizontal surface is present after the mobile body 1 passes the downward slope, infrared light output from the laser range sensor 13 is reflected by the horizontal surface, and the reflected infrared light may be received by the laser range sensor 13 during movement of the mobile body 1 on the downward slope.

Presence of the infrared light reflected by the horizontal surface causes the local map generator 142, as illustrated in FIG. 4B, to obtain a local map M2 that includes an image of an obstacle which is not originally present in the mobile environment ME (an image of the horizontal surface). FIG. 4B is a diagram illustrating one example where a local map including an image of an obstacle which is not present in a mobile environment is obtained by infrared light reflected from a horizontal surface.

When the local map M2 that includes an image of a horizontal surface which is not originally present is matched with an environmental map M1, for example, as illustrated in FIG. 4C, the image of the horizontal surface on the local map M2 may be falsely recognized as an image of a wall present at the end of the horizontal surface on the environmental map M1. As a result, the self-position estimator 143 can falsely estimate, as indicated by a dotted line in FIG. 4C, the first self-position and/or the first posture of the mobile body 1 during execution of the first estimating mode. FIG. 4C is a diagram illustrating one example where, when the local map includes the image of the horizontal surface which is not originally present in the mobile environment, false estimation of the self-position and/or the posture of the mobile body occurs.

In order to avoid such false estimation, a local map disposing region A indicated by an alternate long and short dash line in FIG. 4C is set on the environmental map M1, and during execution of the first estimating mode, the self-position estimator 143 disposes the local map M2 at a position that is excessively far from an original position and prevents occurrence of false estimation as illustrated in FIG. 4C.

Alternatively, for example, at a position where a moving surface in contact with the main wheels 123*a* and 123*b* of the mobile body 1 gets wet by water and the like, the main wheels 123*a* and 123*b* easily slip, and thus the estimation error(s) of the self-position and/or the posture in the self-position estimator 143 easily occur(s). At the position where the moving surface gets wet, therefore, the local map disposing region A with a large size is set in the attribute information AI, and thus the mobile body significantly reduces or prevents an estimation error at the position.

During creation of the environmental map M1 and the traveling schedule TS, the self-position estimator 143 may input an amount of user's operation of the mobile body 1 (for example, the rotation numbers of the motors 121*a* and 121*b* and a moving speed of the mobile body 1 to be calculated based on the rotation numbers) through the traveling controller 145, and may associate the input operation amount with the traveling schedule TS.

When the obtaining of the local map M2, the estimation of the self-position and/or the posture, the creation of the traveling schedule TS and the environmental map M1, and the setting of the attribute information AI are repeated until the user moves the mobile body 1 to a moving end position, a traveling schedule TS, an environmental map M1, and an attribute information AI of the mobile body 1 that has moved from a moving start position to a moving end position is able to be created to be stored in the storage 141.

The environmental map M1, the traveling schedule TS, and/or the attribute information AI is able to be created not only by instruction while the user is operating the mobile body 1 but also, for example, by using other input devices (keyboard and mouse) without performing an operation of the mobile body 1.

Further, as described above, when the local map M2 includes an obstacle that is not originally present and thus the environmental map M1 also includes an obstacle that is not originally present, the environmental map M1 is edited so that an image of the non-present obstacle is deleted.

After the environmental map M1, the traveling schedule TS, and the attribute information AI are created, the mobile body 1 is, if necessary, disposed on the moving start position, and a traveling mode of the mobile body 1 is switched by using, for example, an input device that operates the mobile body 1, into an autonomous mode in which the mobile body 1 is autonomously moved according to the traveling schedule TS.

When the traveling mode is switched to the autonomous mode and the mobile body 1 starts to autonomously move, the local map generator 142 generates a local map M2 as described above to store the local map M2 in the storage 141 (step S2).

After obtaining the local map M2, the self-position estimator 143 estimates a self-position and/or a posture of the mobile body 1. To estimate the self-position and/or the posture of the mobile body 1, the self-position estimator 143 decides to estimate the first self-position and/or the first posture by map matching (the first estimating mode), and/or estimate the second self-position and/or the second posture based on the rotation amounts of the main wheels 123a and 123b (the second estimating mode).

For this reason, the self-position estimator 143 first determines whether the mobile body 1 is moving in a non-obstacle region where only a small number of obstacles are present or no obstacle is present in the mobile environment ME (step S3).

For example, when the local map M2 obtained in step S2 is an "empty" local map M2 (that includes no data representing an image of an obstacle) or a local map M2 that includes only a small number of obstacles ("Yes" in step S3), the self-position estimator 143 determines that the mobile body 1 is moving in the non-obstacle region.

When determining that the mobile body 1 is moving in the non-obstacle region, the self-position estimator 143 decides that the first estimating mode is not executed. This is because the local map M2 obtained on the non-obstacle region does not include information about obstacles sufficient to perform accurate map matching.

In this case, the self-position estimator 143 executes only the second estimating mode, and estimates the second self-position and/or the second posture estimated based on the rotation amounts of the main wheels 123a and 123b as the self-position and/or the posture of the mobile body 1 (step S4).

In step S3, for example, when the first estimating mode and/or the second estimating mode have/has been executed and thus the self-position and/or the posture of the mobile body 1 have/has been already estimated, a determination may be made as to whether the mobile body 1 is moving in the non-obstacle region based on the estimated self-position (or the posture). For example, when the estimated self-position has a coordinate value included in the non-obstacle region where no obstacle or only a small number of obstacles are present on a coordinate plane representing the mobile environment ME, the determination that the mobile body 1 is moving in the non-obstacle region is able to be made.

As described above, while the mobile body 1 is moving in the non-obstacle region, the self-position estimator 143 decides that the first estimating mode is not executed. As a result, when estimation of the first self-position and/or the first posture by map matching is difficult, unnecessary execution of the first estimating mode is able to be avoided.

For example, when the local map M2 in which obstacle images are present has been obtained or the estimated self-position has a coordinate value indicating an outer side of the non-obstacle region ("No" in step S3), the self-position estimator 143 decides that the first estimating mode is executable. This is because when the local map M2 in which obstacle images are present has been obtained, the map matching is executable.

After the first estimating mode is determined to be executable, the self-position estimator 143 instructs the adjuster 144 to adjust the size of the local map disposing region A (step S5). A method for adjusting the local map disposing region A in step S5 will be described in detail later.

After the size of the local map disposing region A is adjusted, the self-position estimator 143 further decides whether the self-position and/or the posture is able to be accurately estimated only by the execution of the first estimating mode.

Specifically, the self-position estimator 143 determines whether the mobile body 1 is moving in a monotonically shaped region having a monotonous shape on the environmental map M1 and/or the local map M2 (step S6).

For example, when the local map M2 obtained in step S2 has a characteristic shape ("No" in step S6), namely, when the determination is made that the mobile body 1 is moving in the characteristically shaped region having a characteristic shape on the environmental map M1, the self-position estimator 143 determines that the self-position and/or the posture is/are able to be accurately estimated only by execution of the first estimating mode. In this case, the self-position estimator 143 executes only the first estimating mode to estimate the self-position and/or the posture of the mobile body 1 (step S7).

Specifically, the self-position estimator 143 first sets the local map disposing region A on the environmental map M1. For example, when the local map disposing region A is defined as a quadrate where a length of one side is L, a position at which the local map M2 should be disposed is calculated as (X1,Y1), based on the rotation amounts of the main wheels 123a and 123b, and the self-position estimator 143 defines two inequalities, $-L/2+X1 \leq X \leq L/2+X1$ and $-L/2+Y1 \leq Y \leq L/2+Y1$, on a coordinate plane representing the mobile environment ME, to set the local map disposing region A on the environmental map M1.

Alternatively, for example, when the local map disposing region A is defined as a circle with a radius R, an inequality, $(X-X1)^2+(Y-Y1)^2 \leq R^2$, is defined on the coordinate plane, so that the local map disposing region A is able to be set on the environmental map M1.

Further, for example, when a rotation angle width of the local map M2 (the size of the local map disposing region A relating to the posture) is defined as $\Delta\theta$, a rotation angle of the local map M2 is estimated as $\theta 1$, based on the rotation amounts of the main wheels 123a and 123b, and the self-position estimator 143 defines an inequality, $-\Delta\theta/2+\theta 1 \leq \theta \leq \Delta\theta/2+\theta 1$, on the coordinate plane so as to set the local map disposing region A relating to the posture on the environmental map M1. In this case, the self-position estimator 143 is able to rotate the local map M2 within an angle range $\theta$ represented by the inequality, $-\Delta\theta/2+\theta 1 \leq \theta \leq \Delta\theta/2+\theta 1$.

After setting the local map disposing region A on the environmental map M1 as described above, the self-position estimator 143 disposes the local map M2 at a plurality of disposing positions in the local map disposing region A set on the environmental map M1. Further, the self-position estimator 143 rotates the local map M2 through a plurality of rotation angles within a range represented on the local map disposing region A, at each of the plurality of disposing positions.

Since the local map M2 has been obtained by the local map generator 142, the local map M2 is also, similarly to the environmental map M1, aggregate of coordinate value data indicating positions of obstacles on the coordinate plane representing mobile environment ME.

Therefore, the disposition of the local map M2 in the local map disposing region A on the environmental map M1 is able to be achieved by calculation using a matrix for making parallel transition of the local map M2 being coordinate value data to the disposing position. Further, the rotation of the local map M2 at the disposing position is able to be achieved by calculation using a matrix to rotate the local map M2 being the coordinate value data.

Thereafter, the self-position estimator 143 estimates one of the plurality of disposing positions and one of the plurality of rotation angles that obtain most exact matching between the local map M2 and the environmental map M1, as the first self-position and the first posture respectively. The estimation of the self-position and/or the posture by the map matching is able to be performed by, for example, "likelihood calculation".

The self-position estimator 143 estimates the first self-position estimated in the above manner as the self-position of the mobile body 1 in the mobile environment ME. Further, the self-position estimator 143 estimates the first posture as the posture of the mobile body 1 at the self-position (the first self-position).

On the other hand, for example, when the local map M2 obtained in step S2 has a monotonous shape ("No" in step S6), namely, when the determination is made that the mobile body 1 is moving in the monotonically shaped region having a monotonous shape on the environmental map M1, the self-position estimator 143 determines that the self-position and/or the posture cannot be accurately estimated only by execution of the first estimating mode.

In this case, the self-position estimator 143 executes both the first estimating mode and the second estimating mode to estimate the self-position and/or the posture of mobile body 1 (step S8). While the mobile body 1 is moving in the monotonically shaped region, the self-position estimator 143 estimates the self-position of the mobile body 1 using the second estimating mode, and estimates the posture of the mobile body 1 using the first estimating mode.

Specifically, the self-position estimator 143 first estimates a second self-position based on the rotation amounts of the main wheels 123a and 123b (execution of the second estimating mode), and estimates the second self-position as the self-position of the mobile body 1 in the mobile environment ME.

The self-position estimator 143 then sets the local map disposing region A, as described above, at the second self-position estimated in the second estimating mode. Thereafter, the self-position estimator 143 executes the first estimating mode to rotate the local map M2 within a range of the rotation angle defined in the local map disposing region A, and estimates a first posture being a rotation angle at which the most exact matching is obtained between the environmental map M1 and the local map M2, as a posture of the mobile body 1 at the self-position.

As described above, while the mobile body 1 is moving in the monotonically shaped region, the self-position estimator 143 executes the first estimating mode and the second estimating mode to estimate the self-position and/or the posture of the mobile body 1. As a result, even if the shape of the local map M2 or the environment map M1 is simple, depending on a moving direction of the mobile body 1, if the self-position and/or the posture is able to be accurately estimated by map matching, the first self-position and/or the first posture is able to be accurately estimated in the first estimating mode. Further, when the self-position and/or the posture cannot be estimated by map matching, the self-position and/or the posture is able to be estimated in the second estimating mode.

While the mobile body 1 is moving in the monotonically shaped region, the size of the local map disposing region A is set to a predetermined size as a size during normal execution of the first estimating mode. As a result, an unnecessary increase in a computation amount required to estimate the first self-position and/or the first posture in the first estimating mode is avoided, and thus a time for the estimation is shortened.

For example, as illustrated in FIG. 5A, when the mobile body 1 is moving in a monotonically shaped region representing a linear route defined by two walls on the environmental map M1, along a section extending from the linear route, the self-position of the mobile body 1 along the extended section cannot be accurately estimated by map matching (the first estimating mode). This is because, as illustrated in FIG. 5A, even when the local map M2 obtained in such a region is disposed at any position on the section extending from the route, matching is obtained between the local map M2 and the environmental map M1. In this case, the self-position estimator 143 estimates the self-position of the mobile body 1 based on the rotation amounts of the main wheels 123a and 123b, namely, by execution of the second estimating mode. FIG. 5A is a diagram illustrating one example where the self-position cannot be estimated by map matching.

When the local map M2 is displaced from the environmental map M1 in a width direction of a linear route (a direction perpendicular to the extended section from the route), the self-position of the mobile body 1 in the width direction of the linear route is able to be estimated by execution of first estimating mode.

For example, when the local map M2 illustrated on a left portion of FIG. 5B is obtained, the local map M2 is set at the self-position on the environmental map M1 estimated based on the rotation amounts of the main wheels 123a and 123b. Thereafter, when the local map M2 is rotated about the self-position until the local map M2 matches with the environmental map M1, as illustrated on a right portion of FIG. 5B, the rotation angle is able to be uniquely estimated as the posture of the mobile body 1. FIG. 5B is a diagram illustrating one example where the posture is able to be estimated by map matching.

The first estimating mode and/or the second estimating mode are/is suitably selected for each region where the mobile body 1 is moving, and after the self-position and/or the posture of the mobile body 1 are/is estimated, the traveling controller 145 controls the motors 121a and 121b based on the estimated self-position and/or the posture (step S9).

Specifically, in the traveling schedule TS, the traveling controller 145 first sets a position and/or a posture, next to a position and/or a posture that are/is closest to the estimated self-position and/or the estimated posture, as a target position and/or a target posture at which the mobile body 1 should move.

The traveling controller 145 then calculates the control amounts of the motors 121a and 121b, based on the difference(s) between the target position and/or the target posture and the estimated self-position and/or the estimated posture, so as to output driving power based on the calculated control amounts to the motors. As a result, the mobile body 1 is able to move toward the target position and/or the target posture.

After the traveling controller 145 controls the motors 121a and 121b, when the mobile body 1 has not reached a final target position indicated in the traveling schedule TS or the mobile body 1 is not stopped by a user ("No" in step S10), a process returns to step S2.

On the other hand, when the mobile body 1 has reached the final target position indicated in the traveling schedule TS or the mobile body 1 is stopped by a user ("Yes" in step S10), the controller 14 stops the mobile body 1.

When the self-position estimator 143 is able to estimate the self-position and/or the posture of the mobile body 1 by map matching upon execution of steps S1 to S10, the self-position estimator 143 is able to accurately estimate the first self-position and/or the first posture to be estimated by execution of the first estimating mode as the self-position and/or the posture of the mobile body 1.

When the self-position and/or the posture of the mobile body 1 cannot be estimated by map matching, the second self-position and/or the second posture to be estimated by execution of the second estimating mode is/are able to be estimated as the self-position and/or the posture of the mobile body 1.

As a result, even when the mobile body 1 is moving in any region, the traveling controller 145 inputs estimated results as the self-position and/or the posture of the mobile body 1, and controls the motors 121a and 121b (the main wheels 123a and 123b), based on the estimated results.

A method for adjusting the local map disposing region A to be executed in step S5 will be described with reference to FIG. 6. FIG. 6 is a flowchart illustrating the method for adjusting the local map disposing region.

In the present preferred embodiment, the adjuster 144 adjusts the size of the local map disposing region A according to a predetermined condition under which the local map disposing region A is to be adjusted. Specifically, the adjuster 144 adjusts the size of the local map disposing region A preferably when the following five conditions occur: (i) when the size of the local map disposing region A is specified by the attribute information AI, (ii) when the second estimating mode is stopped and estimation in only the first estimating mode is started, (iii) when movement is restarted from a halted state, (iv) when the mobile body 1 is surrounded by obstacles, and (v) when the mobile body 1 is in the halted state.

Therefore, the adjuster 144 determines whether the attribute information AI set for a current self-position (and/or a current posture) of the mobile body 1 is stored in the storage 141 (step S501).

When the attribute information AI set for the current self-position is present ("Yes" in step S501), the adjuster 144 adjusts the size of the local map disposing region A to a size indicated by the attribute information AI (step S502) to end the process.

By setting the size of the local map disposing region A according to the attribute information AI, the adjuster 144 adjusts the size of the local map disposing region A according to conditions on the positions on the environmental map M1 (in the mobile environment ME) (for example, conditions such as a passage is (downward) slope, or a moving surface is slippery).

As a result, for example, while the mobile body 1 is moving in a region where an estimation error easily occurs, the local map disposing region A is enlarged so that the estimation error is quickly eliminated. On the other hand, while the mobile body 1 is moving in a region where a false estimation easily occurs, the local map disposing region A is reduced so that disposition of the local map M2 at a position where a false estimation occurs or rotation of the local map M2 at an angle where a false estimation occurs is avoided.

When the attribute information AI is not set to the current self-position and/or the posture of the mobile body 1 ("No" in step S501), the adjuster 144 determines whether the second estimating mode is stopped and estimation in only the first estimating mode is started (step S503). That is, the adjuster 144 decides whether the estimation error(s) of the self-position and/or the posture (the second self-position and/or the second posture) accumulated in the second estimating mode are/is eliminated by execution of the first estimating mode.

As illustrated in a flowchart of FIG. 3, timing at which the second estimating mode is stopped and estimation of the self-position and/or the posture is started only in the first estimating mode includes (I) timing at which the mobile body 1 moves from a non-obstacle region to an obstacle region (a characteristically shaped region), and (II) timing at which the mobile body 1 moves from a monotonically shaped region to a characteristically shaped region.

Therefore, when the current self-position and/or the current posture of the mobile body 1 indicates that the mobile body 1 is moving from a vicinity of a boundary between a characteristically shaped region and a non-obstacle region or a vicinity of a boundary between the characteristically shaped region and a monotonically shaped region toward the characteristically shaped region ("Yes" in step S503), the adjuster 144 enlarges the local map disposing region A in order to eliminate an estimation error accumulated by executing the second estimating mode (step S504).

The size of the local map disposing region A to be enlarged is made to be larger, for example, as a time during which estimation of the second self-position and/or the second posture in the second estimating mode continues becomes longer. This is because an estimation error of the second self-position and/or an estimation error of the second posture based on the rotation amounts of the main wheels 123a and 123b are/is accumulated larger as an execution time of the second estimating mode becomes longer.

After the local map disposing region A is enlarged, the adjuster 144 determines whether a predetermined time has passed since start of enlargement of the local map disposing region A (step S505). The predetermined time during which the local map disposing region A is enlarged is made longer, for example, as a time during which the estimation of the second self-position and/or the second posture in the second estimating mode continues becomes longer.

When a predetermined time has not passed since start of the enlargement of the local map disposing region A ("No" in step S505), the adjuster 144 determines that estimation of the first self-position and/or the first posture by map matching where the local map disposing region A is enlarged is not sufficiently performed to eliminate an accumulated estimation error. In this case, the adjuster 144 keeps the enlarged local map disposing region A.

On the other hand, when a predetermined time has passed since start of the enlargement of the local map disposing region A ("Yes" in step S505), the adjuster 144 determines that an estimation error of the self-position and/or an estimation error of the posture accumulated by execution of the second estimating mode are/is eliminated, to return the size of the local map disposing region A to a predetermined size (for example, a size in the normal first estimating mode in which an estimation error is not eliminated) (step S506).

As described above, after the second estimating mode is stopped, the first estimating mode is executed with the local map disposing region A enlarged. As a result, even when the mobile body 1 is moving, the self-position estimator 143 eliminates an estimation error accumulated by execution of the second estimating mode and also estimates the first self-position and the first posture. This is because the enlargement of the local map disposing region A enables the self-position estimator 143 to dispose the local map M2 on the environmental map M1 beyond a range defined according to a mobile capability of the mobile body 1.

Further, after execution of the first estimating mode in which the local map disposing region A is enlarged for a predetermined time, the size of the local map disposing region A is returned (reduced) to a predetermined size. Accordingly, the computation amount required to estimate the first self-position and/or the first posture is prevented from unnecessarily increasing after an accumulated estimation error is eliminated. As a result, a time to estimate the first self-position and/or the first posture is able to be shortened.

When an estimation error accumulated by executing the second estimating mode is not present ("Yes" in step S503) because the mobile body 1 continuously moves in the characteristically shaped region or steps S504 to S506 are executed, the adjuster 144 determines whether the mobile body 1 has started to move after a halted state (step S507).

For example, when the number of pulses to be output from the encoders 125a and 125b abruptly rises from almost 0, the adjuster 144 determines that the mobile body 1 starts to move after the halted state.

When the mobile body 1 starts to move after the halted state ("Yes" in step S507), the adjuster 144 enlarges the local map disposing region A only for a predetermined time (steps S504 to S506).

When the mobile body 1 starts to move from the halted state, the size of the local map disposing region A is enlarged to be larger than a size during execution of the normal first estimating mode. Accordingly, the self-position estimator 143 eliminates an estimation error of the self-position and/or an estimation error of the posture which are/is caused when movement is started from the halted state (mainly caused by slippage between the main wheels 123a, 123b and a moving surface) by execution of the first estimating mode in which the local map disposing region A is enlarged, so as to maintain accuracy of estimating the self-position and/or the posture of the mobile body.

On the other hand, when the determination is made that the mobile body 1 has not started to move from the halted state ("No" in step S507), the adjuster 144 determines whether the mobile body 1 is surrounded by unknown obstacles (obstacles) that do not appear on the environmental map M1 (step S508). Specifically, the determination as to whether the mobile body 1 is surrounded by unknown obstacles (obstacles) is done as follows.

As illustrated in FIG. 7A, a case is considered in which, in the mobile environment ME, the mobile body 1 is present in a region that is surrounded by a wall W1 and includes one obstacle O1. Further, the environmental map M1 is created in a state where the obstacle O1 is present in the region surrounded by the wall W1 as illustrated in FIG. 7A.

Thereafter, when the mobile body 1 autonomously moves to the region, it is assumed that a plurality of obstacles O2 to O7 are present near obstacle O1 as illustrated in FIG. 7B. FIG. 7A and FIG. 7B are diagrams illustrating examples where a surrounding determination is made.

Figure 8A:
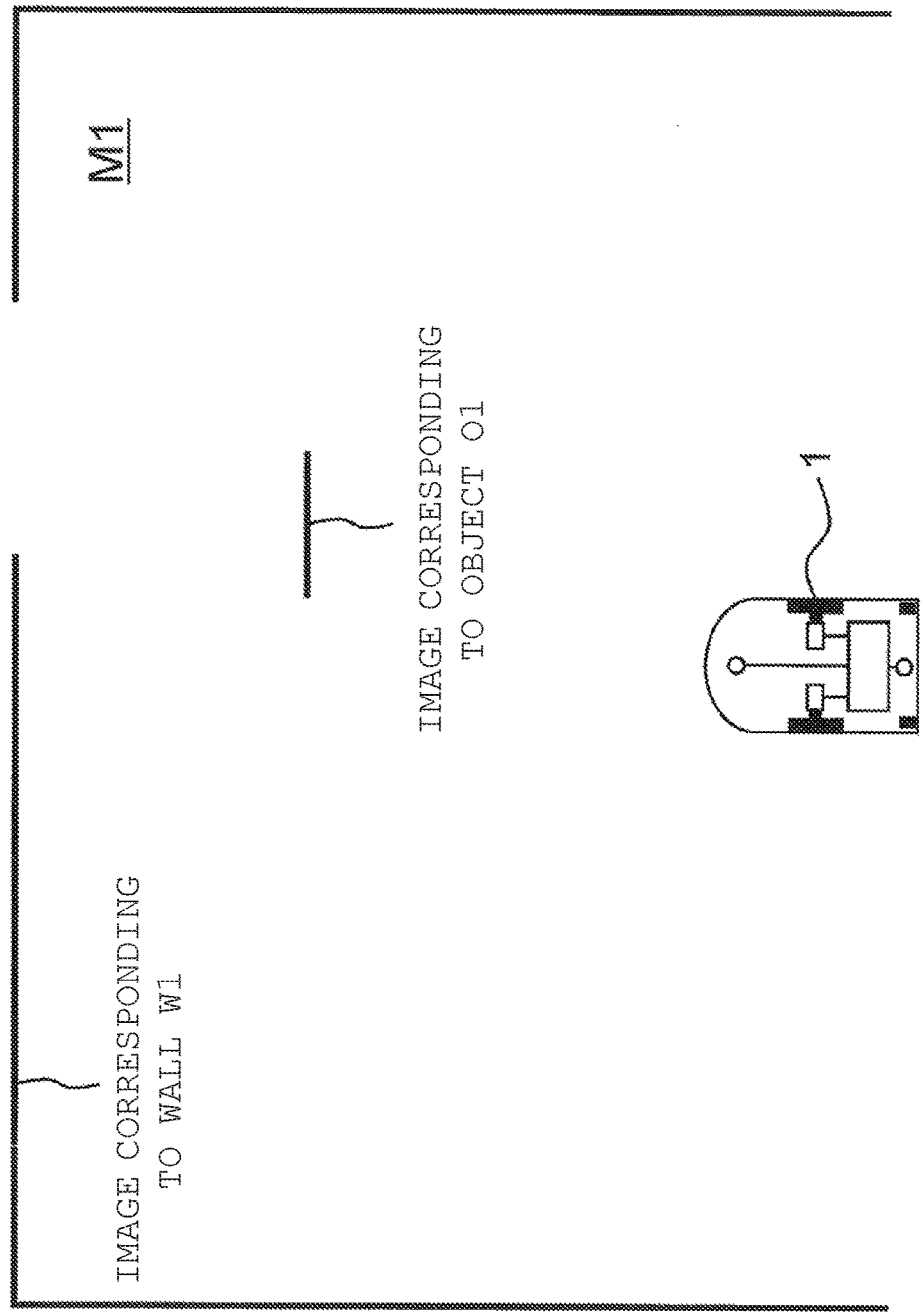
FIG. 8A is a diagram illustrating one example of an environmental map obtained when an unknown obstacle is not present.

In this case, the environmental map M1 to be obtained in the state illustrated in FIG. 7A includes an image corresponding to the wall W1 and an image corresponding to the obstacle O1 as illustrated in FIG. 8A. The local map M2 that is obtained when the mobile body 1 autonomously moves to the region and unknown obstacles O2 to O7 illustrated in FIG. 7B are present in the region is as illustrated in FIG. 8B, for example. The local map M2 illustrated in FIG. 8B includes images corresponding to the unknown obstacles O2 to O7 in addition to the images corresponding to the wall W1 and the obstacle O1.

FIG. 8A is a diagram illustrating one example of an environmental map obtained when an unknown obstacle is not present. FIG. 8B is a diagram illustrating one example of a local map obtained when unknown obstacles are present.

Figure 9:
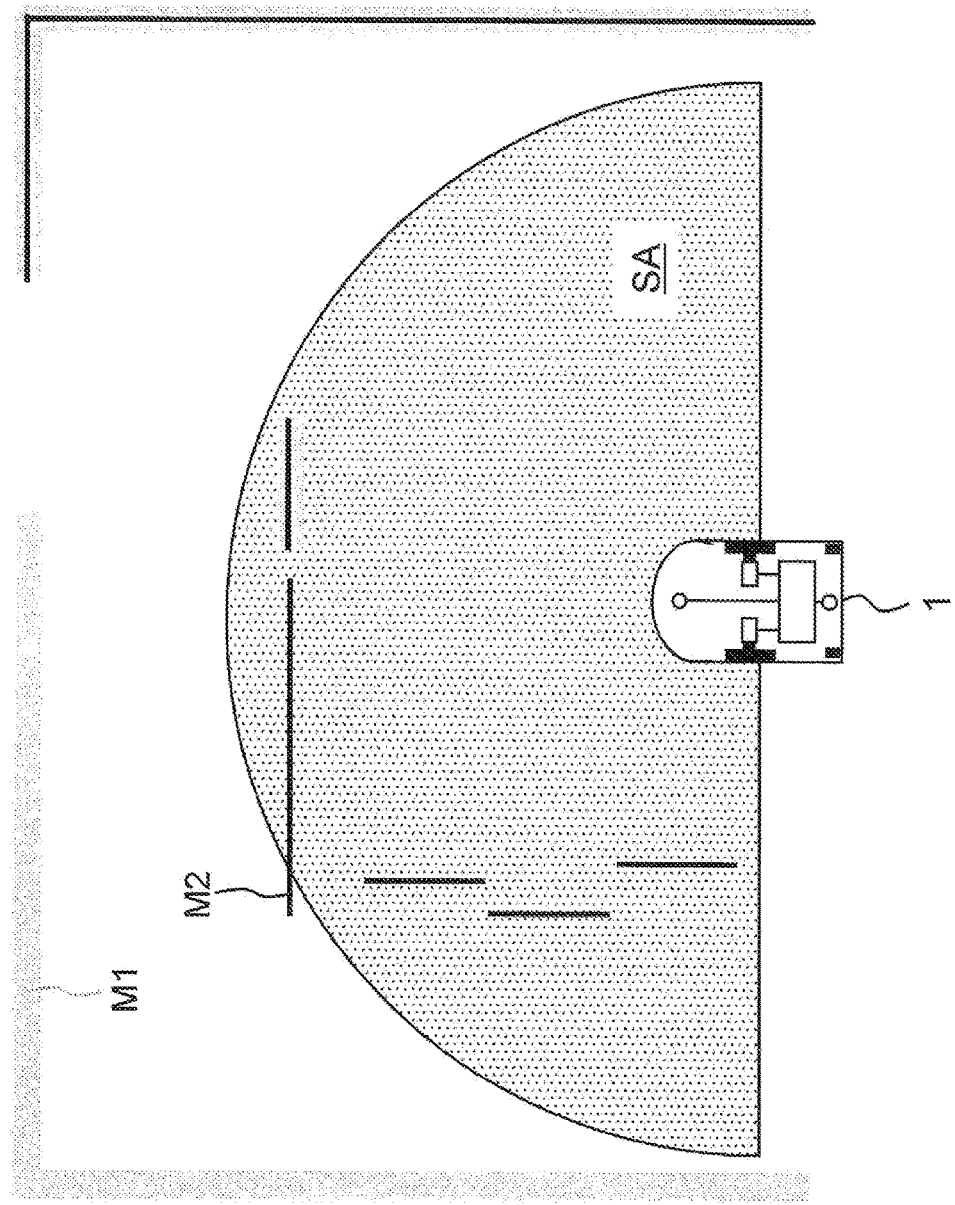
FIG. 9 is a diagram illustrating one example of a surrounding determining method.

As illustrated in FIG. 9, map matching is performed between the environmental map M1 illustrated in FIG. 8A (in FIG. 9, an image indicated by a light-colored, thick solid line) and the local map M2 illustrated in FIG. 8B (in FIG. 9, an image indicated by a black thin line). At this time, for example, when a predetermined number or more of images that do not appear on the environmental map M1 (four in the example of FIG. 9) are present in a surrounding determination region SA that has a semicircular shape with a predetermined radius whose center is the mobile body 1, the adjuster 144 determines that the mobile body 1 is surrounded by the unknown obstacles (obstacles) O2 to O7. FIG. 9 is a diagram illustrating one example of a surrounding determination method.

As a result of executing the determination method, when the determination is made that the mobile body 1 is surrounded by unknown obstacles (obstacles) ("Yes" in step S508), the adjuster 144 reduces the size of the local map disposing region A to be smaller than a size when the mobile body 1 is not surrounded by the unknown obstacles (for example, a predetermined size during normal execution of the first estimating mode) (step S509).

For example, the adjuster 144 reduces the size of the local map disposing region A to a size calculated according to a relational expression, (predetermined size)−(degree of surrounding*0.5). The "degree of surrounding" can be decided based on, for example, a number of images corresponding to the unknown obstacles determined as being included in the surrounding determination region SA at the time of the surrounding determination.

Figure 10:
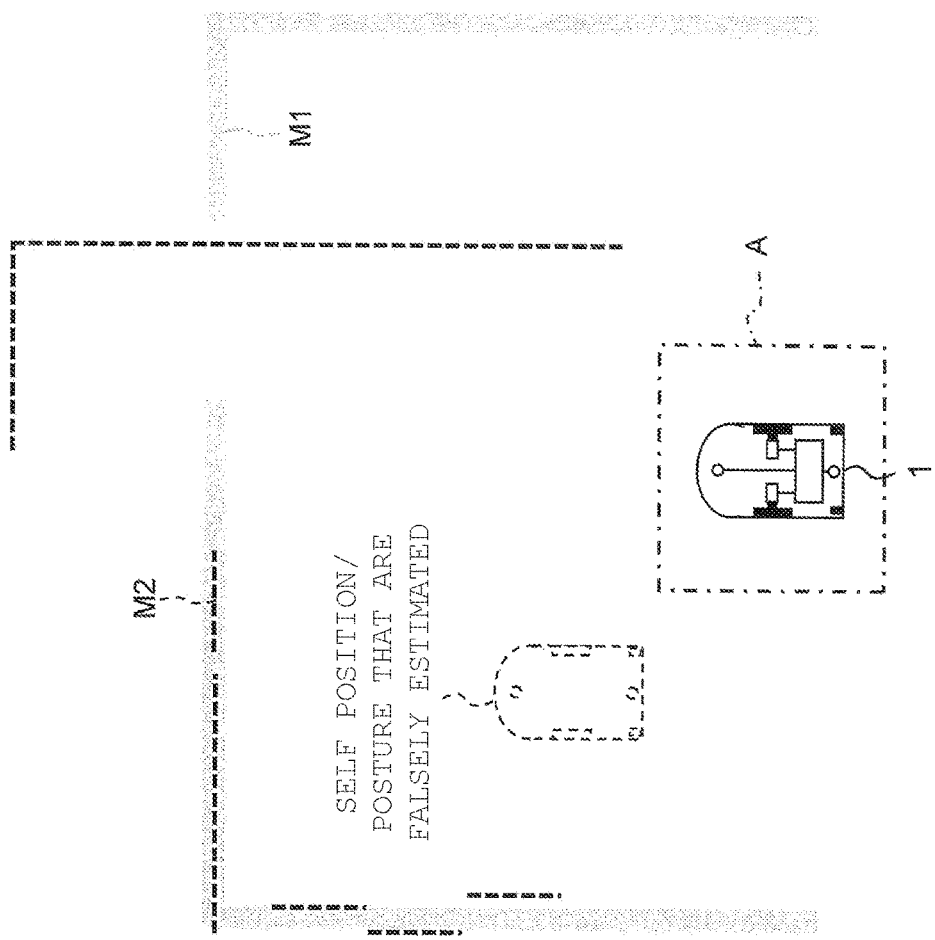
FIG. 10 is a diagram illustrating one example where a self-position and/or a posture are/is falsely estimated because a mobile body is surrounded by unknown obstacles.

When the mobile body 1 is surrounded by unknown obstacles that do not appear on the environmental map M1 while the mobile body 1 is autonomously moving, and the environmental map M1 illustrated in FIG. 8A and the local map M2 illustrated in FIG. 8B are obtained, as illustrated in FIG. 10, for example, images corresponding to the unknown obstacles are falsely estimated as a wall on the environmental map M1, and thus the self-position and/or the posture of the mobile body 1 may be falsely estimated. FIG. 10 is a diagram illustrating one example where the self-position and/or the posture are/is falsely estimated because the mobile body is surrounded by unknown obstacles.

In this case, when the adjuster 144 adjusts the size of the local map disposing region A, and sets a reduced local map disposing region A, for example, as indicated by an alternate long and short dash line in FIG. 10, the local map M2 is prevented from being disposed at a position where an false estimation occurs, as shown in FIG. 10, on the environmental map M1. That is, improper map matching between the environmental map M1 and the local map M2 due to presence of unknown obstacles is prevented, and thus a false estimation of the first self-position and/or the first posture is prevented.

When the determination is made in step S508 that the mobile body 1 is surrounded by unknown obstacles, the traveling controller 145 stops electricity supply to the motors 121a and 121b so that the rotation of the main wheels 123a and 123b is stopped, and thus the mobile body 1 is stopped. When the mobile body 1 is stopped in such a manner, the adjuster 144 may set the size of local map disposing region A to 0 in step S509.

When the size of the local map disposing region A is set to 0, a false estimation of the first self-position and/or the first posture is prevented.

On the other hand, when the determination is made that the mobile body 1 is not surrounded by unknown obstacles (obstacles) ("No" in step S508), the adjuster 144 determines whether the mobile body 1 is in a halted state (step S510). For example, when the number of pulses to be output from the encoders 125a and 125b is (almost) 0, the adjuster 144 determines that the mobile body 1 is in the halted state.

When the determination is made that the mobile body 1 is in the halted state ("Yes" in step S510), the adjuster 144 reduces the size of the local map disposing region A to a size 0 or a size close to 0, for example, so as to make the local map disposing region A smaller than a size during the movement of the mobile body 1 (step S509).

As a result, when the self-position and/or the posture hardly change/changes, use of the small local map disposing region A enables a computation amount required to estimate the first self-position and/or the first posture to be decreased without unnecessarily moving the local map M2.

As a result of executing steps S501 to S510, when the determination is made that a predetermined condition, under which the size of the local map disposing region A should be currently adjusted, does not occur ("No" in step S510), the adjuster 144 sets the size of the local map disposing region A to a predetermined size (a size during normal execution of the first estimating mode) (step S511).

As a result, when the condition, under which the size of the local map disposing region A should be adjusted, does not occur, the adjuster 144 is able to set the size of the local map disposing region A to the predetermined size.

Execution of steps S501 to S511 enables the adjuster 144 to adjust the size of the local map disposing region A to a suitable size according to a predetermined condition under which the size of the local map disposing region A should be adjusted. As a result, while accuracy of estimating the self-position and/or the posture of the mobile body 1 is maintained, a computation amount required to estimate the self-position and/or the posture by the map matching is prevented from unnecessarily increasing, and thus a time for the estimation is shortened.

Further, the execution of steps S501 to S511 enables the adjuster 144 to adjust the size of the local map disposing region A preferentially in the following order: (i) when the size of the local map disposing region A is specified by attribute information, (ii) when the second estimating mode is stopped and estimation only in the first estimating mode is started, (iii) when the movement is started from the halted state, (iv) when the mobile body 1 is surrounded by obstacles, and (v) when the mobile body 1 is in the halted state.

That is, as illustrated in FIG. 6, the adjuster 144 makes a determination according to the conditions (i) to (v) in this order so that even if the conditions simultaneously occurs, the size of the local map disposing region A is able to be adjusted according to the condition with a higher priority.

For example, when the mobile body 1 halts at a position where the attribute information AI is set, determination is "Yes" in step S501 in the flowchart of FIG. 6, and thus step S502 is executed, and the process to adjust the size of the local map disposing region A is completed. That is, when the determination is made that the mobile body 1 is present at the position where the attribute information AI is set, the determination is not made as to whether the mobile body 1 halts after the size of the local map disposing region A is adjusted according to the attribute information AI.

In the adjustment process of the size of the local map disposing region illustrated in FIG. 6, order of the determinations in (i) to (v) is suitably changed, so that priorities of the conditions can be freely decided.

Other Preferred Embodiments

Preferred embodiments of the present invention have been described above, but the present invention is not limited to the above preferred embodiments, and various modifications can be made within a range that does not deviate from the subject matter of the present invention. In particular, the plurality of preferred embodiments and alternative preferred embodiments described in this specification can be arbitrarily combined as needed or desired.

Figure 11:
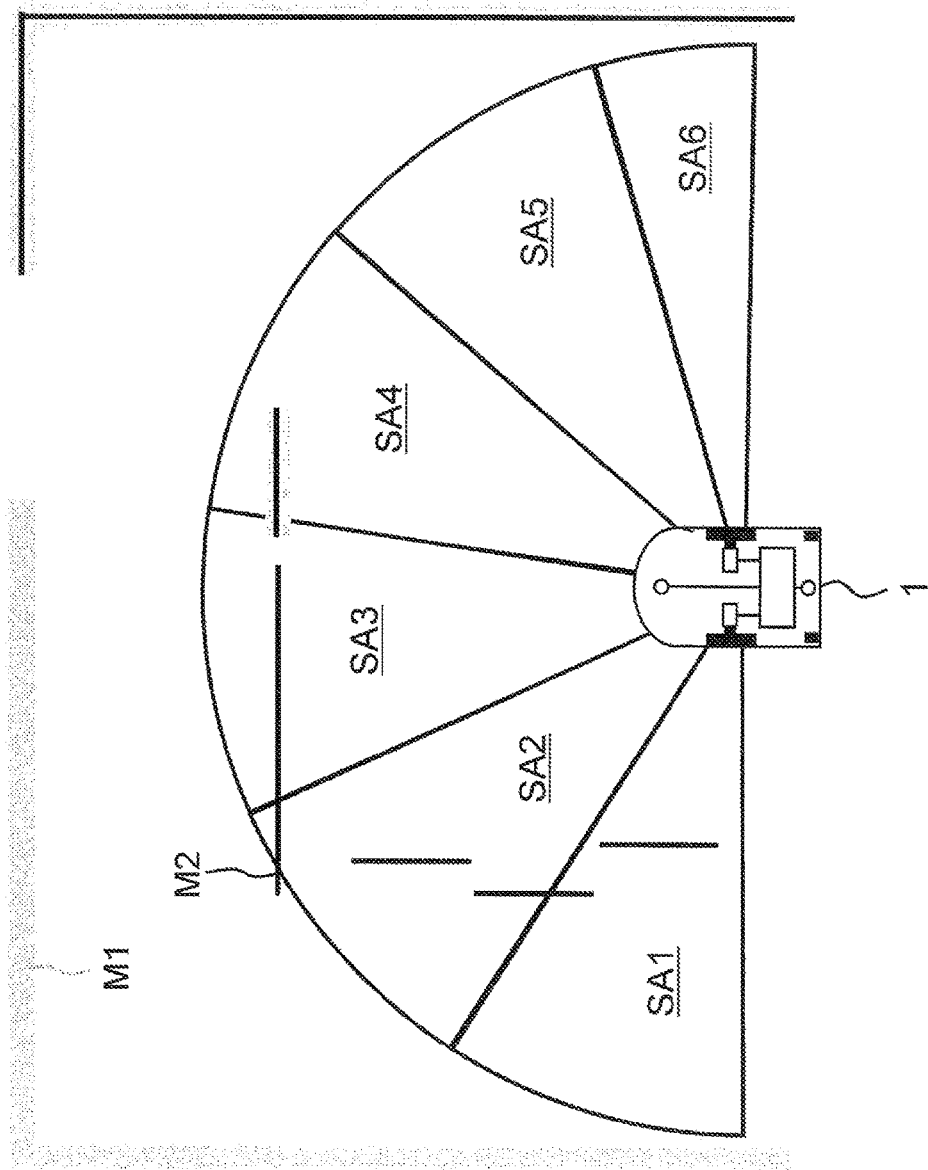
FIG. 11 is a diagram illustrating surrounding detection according to another preferred embodiment of the present invention.

In the first preferred embodiment, the surrounding detection in step S508 preferably is performed by using only one surrounding determination region SA. However, the present invention is not limited thereto, and the adjuster 144 may perform the surrounding detection using a plurality of determination regions in step S508. For example, as illustrated in FIG. 11, by using a plurality of fan-shaped surrounding determination regions SA1 to SA6 each with a predetermined center angle, a determination may be made as to how many images indicating unknown obstacles are included in each surrounding determination region. FIG. 11 is a diagram illustrating surrounding detection according to other preferred embodiments.

The surrounding determination is made by using the plurality of surrounding determination regions SA1 to SA6 illustrated in FIG. 11, so that the surrounding determination is able to be made in each traveling direction of the mobile body 1. By performing the surrounding detection in each traveling direction of the mobile body 1, for example, the mobile body 1 is enabled to perform a specific operation toward a specific direction.

For example, when the mobile body 1 is an advertising robot, advertising may be performed intensively toward a direction in which a surrounding determination region including the largest number of unknown obstacles is present.

Alternatively, for example, when a surrounding determination region including no obstacles is present, the mobile body 1 may be moved toward the region.

In the first preferred embodiment, the environmental map M1 refers to one piece of map information representing an entire mobile environment ME. However, the environmental map M1 may not be one piece of map information as long as the environmental map M1 represents the mobile environment ME. For example, environmental map M1 may be divided into a plurality of sub-environmental maps. In this case, for example, in order to determine a position of the map information related to a sub-environmental map in mobile environment ME, a time at which the sub-environmental map is obtained may be associated with the sub-environmental map.

When the mobile environment ME has a circular shape, division of the environmental map M1 into the plurality of sub-environmental maps decreases the occurrence of mismatching between a portion of an environmental map created by using a local map obtained on a moving start position of the mobile body 1 and a portion of an environmental map created by using a local map obtained when the mobile body 1 returns to a vicinity of the movement start position in the circular-shaped mobile environment ME.

In the first preferred embodiment, the local map disposing region A preferably is a range where the estimation error(s) of the position and/or the posture estimated based on the rotation amounts of the main wheels 123$a$ and 123$b$ are/is taken into account. However, the local map disposing region A is not limited thereto.

The self-position and/or the posture to be estimated based on the rotation amounts of the main wheels 123$a$ and 123$b$ include/includes an estimation error, but it is unlikely that an excessively large estimation error occurs. Further, the self-position and/or the posture estimated based on the rotation amounts of the main wheels 123a and 123b tend(s) to be close to the actual self-position and/or the actual posture of the mobile body 1.

Therefore, the local map disposing region A may be defined based on, for example, probability of the estimation error of the position and/or the estimation error of the posture to be estimated based on the rotation amounts of the main wheels 123a and 123b. For example, the local map disposing region A may be defined by using a normal distribution function (a probability density function) in which an average is at a center of the local map disposing region A (the position and/or the posture estimated based on the rotation amounts of the main wheels 123a and 123b).

In this case, the adjuster 144 is able to adjust, for example, the size of the local map disposing region A through adjustment of a degree of a root-mean-square deviation of the normal distribution function.

When the local map disposing region A is defined by the normal distribution function (the probability density function), the self-position estimator 143 is able to estimate, for example, a disposing position and/or a rotation angle on the local map M2 such that a product of a degree of matching between the environmental map M1 and the local map M2, and a value of the normal distribution function representing the local map disposing region A (the value that becomes smaller with increasing distance from the center of the local map disposing region A) becomes maximum, as the first estimation position and/or the first posture.

Preferred embodiments of the present invention are applicable widely to apparatuses that estimate a self-position and/or a posture of a mobile body moving in a mobile environment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A self-position estimating apparatus that estimates a self-position and/or a posture of a mobile body in an environment in which the mobile body is present, the self-position estimating apparatus comprising:
   a memory that stores an environmental map representing a position of an obstacle present in the environment; and
   a controller; wherein
   the controller is configured or programmed to include:
      a local map generator that generates a local map representing a relative position of the obstacle present around the mobile body, with respect to the mobile body;
      a self-position estimator that executes a first estimating mode to estimate, when the local map is disposed and/or rotated at a plurality of disposing positions in a local map disposing region set on the environmental map, one of the disposing positions where most exact matching is obtained between the local map and the environmental map as a first self-position being the self-position of the mobile body in the environment, and/or to estimate a rotation angle of the local map at the disposing position as a first posture of the mobile body at the first self-position; and
      an adjuster that adjusts a size of the local map disposing region according to a predetermined condition; and
      prior to the adjuster adjusting the size of the local map disposing region, the size of the local map disposing region is set to a predetermined size, which is a size during execution of the first estimating mode.

2. The self-position estimating apparatus according to claim 1, wherein when the mobile body moves from a non-obstacle region where only a predetermined number of the obstacles are present or the obstacle is not present in the environment to an obstacle region where the obstacle is present, the adjuster enlarges the size of the local map disposing region to be larger than the predetermined size for a predetermined time.

3. The self-position estimating apparatus according to claim 2, wherein while the mobile body is moving in the non-obstacle region, the self-position estimator does not execute the first estimating mode.

4. The self-position estimating apparatus according to claim 1, wherein when the mobile body moves from a first region on the environmental map to a second region on the environmental map, the adjuster enlarges the size of the local map disposing region to be larger than the predetermined size for a predetermined time.

5. The self-position estimating apparatus according to claim 4, wherein while the mobile body is moving in the first region or after the predetermined time passes, the adjuster sets the size of the local map disposing region to the predetermined size.

6. The self-position estimating apparatus according to claim 1, wherein
   the mobile body includes one or more main wheels to move in the environment;
   the self-position estimator further executes a second estimating mode to estimate the self-position and/or the posture of the mobile body in the environment as a second self-position and/or a second posture, based on rotation amounts of the main wheels; and
   the adjuster enlarges the size of the local map disposing region to be larger than the size during execution of the first estimating mode for at least a predetermined time after a state of executing the second estimating mode is switched to a state of executing only the first estimating mode.

7. The self-position estimating apparatus according to claim 1, wherein upon start of movement of the mobile body from a halted state, the adjuster enlarges the size of the local map disposing region to be larger than the size during execution of the first estimating mode.

8. The self-position estimating apparatus according to claim 1, wherein when the mobile body halts, the adjuster reduces the size of the local map disposing region to be smaller than the size during execution of the first estimating mode.

9. The self-position estimating apparatus according to claim 1, wherein when the mobile body is surrounded by unknown obstacles that are not indicated on the environmental map, the adjuster reduces the size of the local map disposing region to be smaller than a size when the mobile body is not surrounded by the unknown obstacles.

10. The self-position estimating apparatus according to claim 1, wherein
    the memory stores attribute information for defining the size of the local map disposing region at a predetermined position on the environmental map; and
    the adjuster sets the size of the local map disposing region according to the attribute information.

11. The self-position estimating apparatus according to claim 1, wherein when a plurality of conditions, under which the size of the local map disposing region is adjusted, simultaneously occurs, the adjuster sets the size of the local map disposing region according to one of the plurality of conditions.

12. A self-position estimating method that estimates a self-position and/or a posture of a mobile body in an environment in which the mobile body is present, the self-position estimating method comprising:
- creating an environmental map representing a position of an obstacle present in the environment;
- obtaining a local map representing a relative position of the obstacle present around the mobile body, with respect to the mobile body; and
- when the local map is disposed and/or rotated at a plurality of disposing positions in a local map disposing region being set on the environmental map and having a size adjusted according to a predetermined condition, estimating one of the disposing positions where most exact matching is obtained between the local map and the environmental map as the self-position of the mobile body in the environment, and/or estimating a rotation angle of the local map at the disposing position as a posture of the mobile body on the self-position; wherein
- prior to adjusting the size of the local map disposing region, the size of the local map disposing region is set to a predetermined size, which is a size during execution of the estimation of the one of the disposing positions and/or the estimation of the rotation angle of the local map.

* * * * *